United States Patent
Hayman

(10) Patent No.: US 9,771,922 B2
(45) Date of Patent: Sep. 26, 2017

(54) FLOWING-WATER DRIVEABLE TURBINE ASSEMBLY

(75) Inventor: Jason Hayman, East Cowes (GB)

(73) Assignee: SUSTAINABLE MARINE ENERGY LIMITED, East Cowes, Isle of Wright (GB)

( * ) Notice: Subject to any disclaimer, the term of this patent is extended or adjusted under 35 U.S.C. 154(b) by 869 days.

(21) Appl. No.: 14/117,548

(22) PCT Filed: May 14, 2012

(86) PCT No.: PCT/GB2012/051071
§ 371 (c)(1),
(2), (4) Date: Dec. 12, 2013

(87) PCT Pub. No.: WO2012/156717
PCT Pub. Date: Nov. 22, 2012

(65) Prior Publication Data
US 2015/0115613 A1    Apr. 30, 2015

(30) Foreign Application Priority Data
May 13, 2011    (GB) .................................. 1108051.2

(51) Int. Cl.
*B23P 15/04*    (2006.01)
*F03B 17/06*    (2006.01)
(Continued)

(52) U.S. Cl.
CPC ............ *F03B 17/061* (2013.01); *B23P 15/04* (2013.01); *B63B 21/00* (2013.01); *B63B 21/26* (2013.01);
(Continued)

(58) Field of Classification Search
CPC ....... F03B 13/10; F03B 13/264; F03B 17/061
See application file for complete search history.

(56) References Cited

U.S. PATENT DOCUMENTS 3,105,453 A    10/1963 Hayes
4,142,830 A    3/1979 Schonball
(Continued)

FOREIGN PATENT DOCUMENTS

CN    101 592 117    12/2009
CN    101592117    12/2009
(Continued)

OTHER PUBLICATIONS

Combined Search and Examination Report issued in Great Britain Patent Appl. No. GB1220428.5, dated Nov. 29, 2013.
(Continued)

*Primary Examiner* — Woody Lee, Jr.
(74) *Attorney, Agent, or Firm* — Norton Rose Fulbright US LLP

(57) ABSTRACT

A flowing-water driveable turbine assembly (104) for location in river or sea areas with unidirectional and bidirectional water flows. The turbine assembly comprises a turbine support (106) with positive buoyancy in water. The turbine support (106) is arranged to be anchored by an anchoring system (108) to a water bed. The turbine assembly comprises at least one turbine (110). The positive buoyancy of the turbine assembly in water has an upward force to constrain the turbine support 106 and the at least one turbine (110) to a position of floating equilibrium against a downward force of the anchoring system (108). The turbine assembly may have variable buoyancy, a duct around each turbine for directing water through the turbine to generate power from water flow, and a winch or winches for submerging the turbine assembly or parts thereof.

11 Claims, 13 Drawing Sheets

(51) Int. Cl.

| | | |
|---|---|---|
| *B63B 21/26* | (2006.01) | |
| *E02B 9/08* | (2006.01) | |
| *F03B 13/26* | (2006.01) | |
| *B63B 21/00* | (2006.01) | |
| *F03B 13/10* | (2006.01) | |
| *B63B 21/50* | (2006.01) | |

(52) U.S. Cl.
CPC ............... *E02B 9/08* (2013.01); *F03B 13/10* (2013.01); *F03B 13/264* (2013.01); *B63B 21/50* (2013.01); *F05B 2230/60* (2013.01); *F05B 2230/80* (2013.01); *F05B 2240/124* (2013.01); *F05B 2240/133* (2013.01); *F05B 2240/40* (2013.01); *F05B 2240/917* (2013.01); *F05B 2240/97* (2013.01); *Y02E 10/28* (2013.01); *Y02P 70/527* (2015.11); *Y10T 29/4932* (2015.01); *Y10T 29/49318* (2015.01)

(56) References Cited

U.S. PATENT DOCUMENTS

| | | | | |
|---|---|---|---|---|
| 5,295,793 | A | 3/1994 | Belden | |
| 6,091,161 | A * | 7/2000 | Dehlsen | B63G 8/18 290/43 |
| 8,237,304 | B2 * | 8/2012 | Dehlsen | B63B 21/50 290/43 |
| 8,421,260 | B2 * | 4/2013 | Duke | F03B 13/10 290/54 |
| 9,041,235 | B1 * | 5/2015 | Hunter | F03B 13/00 290/54 |
| 9,086,049 | B2 * | 7/2015 | Vigars | F03B 13/264 |
| 2005/0285407 | A1 * | 12/2005 | Davis | F03B 3/128 290/54 |
| 2006/0153672 | A1 | 7/2006 | Davis | |
| 2006/0232075 | A1 | 10/2006 | Fraenkel | 290/54 |
| 2008/0012345 | A1 | 1/2008 | Parker | 290/54 |
| 2009/0140524 | A1 | 6/2009 | Kejha | 290/54 |
| 2010/0013231 | A1 | 1/2010 | Bolin | 290/54 |
| 2010/0181774 | A1 | 7/2010 | Dehlsen et al. | 290/54 |
| 2010/0212574 | A1 | 8/2010 | Hawkes et al. | |
| 2011/0025069 | A1 | 2/2011 | Kumano | 290/54 |
| 2013/0036731 | A1 | 2/2013 | Kerckove | 60/496 |

FOREIGN PATENT DOCUMENTS

| | | |
|---|---|---|
| DE | 2723147 | 5/1982 |
| DE | 102010033788 | 2/2012 |
| EP | 0995032 | 4/2000 |
| EP | 2 162 618 | 3/2010 |
| ES | 2376803 | 3/2012 |
| GB | 2311566 | 10/1997 |
| GB | 2434410 | 7/2007 |
| GB | 2441821 | 3/2008 |
| GB | 2447774 | 9/2008 |
| GB | 2449436 | 11/2008 |
| GB | 2460309 | 12/2009 |
| GB | 2461435 | 1/2010 |
| GB | 2490737 | 11/2012 |
| GB | 2524667 | 9/2015 |
| NL | 1009566 | 1/2000 |
| WO | WO 01/92720 | 12/2001 |
| WO | WO 2007/100639 | 9/2007 |
| WO | WO2009/062261 | 5/2009 |
| WO | WO/11/091448 | 7/2011 |
| WO | WO2012/037174 | 3/2012 |
| WO | WO/13/083976 | 6/2013 |

OTHER PUBLICATIONS

Combined Search and Examination Report issued in Great Britain Patent Appl. No. GB1317399.2, dated Nov. 27, 2013.
Examination Report issued in Great Britain Patent Appl. No. GB1220428.5, dated Apr. 15, 2013.
International Preliminary Report on Patentability issued in PCT Appl. No. PCT/GB2012/051071, mailed Nov. 19, 2013.
Search Report issued in Great Britain Patent Appl. No. GB1108051.2, dated Jun. 1, 2011.
International Search Report and Written Opinion in International Application No. PCT/GB2013/052998 dated May 27, 2014.
Search Report under Section 17(5) issued in Application No. GB1320070.4 on Jun. 6, 2014.
Examination Report Issued in corresponding Great Britain Patent Application No. GB1507932.0, dated Jan. 26, 2016.
Examination Report Issued in corresponding Great Britain Patent Application No. GB1521287.1, dated Jan. 18, 2016.
Examination Report Issued in corresponding Great Britain Patent Application No. GB1521290.5, dated Jan. 19, 2016.

* cited by examiner

FLOWING-WATER DRIVEABLE TURBINE ASSEMBLY

The present invention relates to a flowing-water driveable turbine assembly to be located in river or sea areas with unidirectional, or bidirectional, water flows to convert the kinetic energy of the water flow into a more easily transferable form of energy, like, for example, hydraulic energy or electrical energy.

It is well known to drive a turbine by flow of water. The extraction of kinetic energy from the water flow causes a reduction in the momentum of the passing water which in turn creates large reaction forces on the turbine. These reaction forces manifest themselves primarily as a drag force acting in the direction of water flow. For example, turbines can typically weigh between 50 and 200 tonnes and can have a rotor diameter between 10 and 21 m and the larger turbines may have a drag of around 1 MN (equivalent to 100 tonnes) under typical water flow of around 6 knots. Thus, a flowing-water driveable turbine assembly must be firmly anchored. Often turbine assemblies are anchored in deep water to avoid interaction with waves found near the surface or to avoid collisions with boats. However, turbines must be transportable to an anchoring site. Turbine assemblies must also be accessible for maintenance and repair in a reasonable amount of time. These aspects of water-driveable turbine technology pose substantial engineering challenges.

Patent publication No. WO99/02853 discloses a stream turbine to cover large areas of water streams and which can be manufactured in a ship yard and transported to a site of use and be anchored there. The stream turbine as a whole can be floated and towed for maintenance or repair.

Patent publication No.s WO2004/085845 and WO2005/061887 disclose support structures for supporting water current turbines in a sea or river estuary. The support structure with turbines may be floated to the water surface for maintenance or repair.

According to an aspect of the present invention, there is provided an anchoring system for anchoring a positively buoyant turbine assembly in water, wherein the turbine assembly has at least one flowing-water driveable turbine for generating power from water flow, wherein the anchoring system comprises at least three anchoring cables anchorable to at least three mutually spaced anchoring points on a water bed covering a footprint greater in width and in length than the turbine assembly, wherein each anchoring point on the water bed is attachable to two mutually spaced attachment points on the turbine assembly and wherein the anchoring system is arranged to provide a downward force to constrain the turbine assembly to a position of floating equilibrium against the upward force of the positive buoyancy of the turbine assembly.

The anchoring system of the present invention has at least a tripod formation of three anchoring cables which provides sufficient downward reactive force and stability to constrain a positively buoyant turbine assembly to a position of floating equilibrium against the upward force of the of the turbine assembly and against drag forces caused by water current flowing past the turbine assembly. Advantageously, inherent flexibility in the anchoring cables can absorb impacts against the turbine assembly or its rotors. Additional stability can be provided by additional anchoring cables without diminishing the anchoring system's ability to absorb shocks.

The top third of the water column (i.e. the optimal position for power extraction) in a deep water site (i.e. 40 m depth or more) is inaccessible to a traditional anchoring system, such as gravity anchors or columns driven into sea bed, due to increased overturning moment cause by water current drag forces. The top third of the water column is accessible to the anchoring system of the present invention, even at deep water sites, by simply varying the length of the anchor cables. Advantageously, inherent flexibility in the anchoring cables permits an increase in divergence from the turbine assembly. This may widen and lengthen the anchoring system's footprint and, in doing so, increase stability to counteract any increased overturning moment experienced by the turbine assembly at a greater elevation above the water bed.

Preferably, the attachments points on the turbine assembly are mutually spaced in at least a direction of upward force of buoyancy. This provides stiffer resistance to heave under water flow.

Preferably, each anchoring cable couples the two attachment points on the turbine assembly to a single anchor point on the water bed. This provides stiffer resistance to pitch and roll which may be caused by wave action upon on the turbine assembly and by a torque reaction from within the turbine when its rotor is turned by water flow.

Preferably, each anchoring cable bifurcates into a pair of cable branches for coupling to the pair of mutually spaced attachment points on the turbine assembly. This economises on anchoring cable by avoiding the use of two cable branches along the entire length.

Preferably, each anchoring cable comprises a mooring line to constrain the turbine assembly against the upward force of the positive buoyancy of the turbine assembly, wherein each anchoring cable comprises a tag line to provide directional support to the turbine assembly and wherein the tag line branches from the mooring line. Use of different lines to perform specific functions improves the performance of the anchoring system.

Preferably, the length of the mooring line and/or the length of the tag line are/is variable. This permits adjustment of the orientation of the turbine assembly when anchored to the water bed by the anchoring system.

Preferably, the tag line has greater elasticity than the mooring line. The tag lines absorb shock and may permit localised movement of the turbine assembly while the mooring lines maintain the fundamental stiffness of the anchoring system.

Preferably, the tag line and the mooring line are made of different materials. The mooring line may be made of a high performance material with extra strength such as DYNEEMA (trade mark) polyethylene rope. The tag lines may be made of a basic material such as braided nylon thereby economising on cost.

Preferably, the tag line branches from the mooring line at an intermediate point along the length of the mooring line. Directional support to the turbine assembly is improved from an intermediate point of the anchoring cable rather than from the anchoring point. This also economises on use of tag line.

Preferably, the at least three anchoring cables are four anchoring cables diverging outwardly from the turbine assembly to the water bed in a substantially pyramidal form on the water bed. This provides increased resistance to heave under water flow.

Preferably, the at least three anchoring cables are at least six pairs of anchoring cables, wherein ends of each pair of anchoring cables are coupled to a respective anchor point on the water bed, wherein the anchoring cables of each pair of anchoring cables diverge from said anchoring point to where opposite ends of the anchoring cables are fixed to a pair of mutually spaced points of the turbine assembly, and wherein at least three pairs of anchoring cables are fixed to each end of the elongate turbine assembly. This provides greater stability in water flow.

Preferably, an angle of inclination of the anchoring cables from the water bed and with respect to the horizontal is no more than about 60 degrees. More preferably, an angle of inclination of the anchoring cables from the water bed and with respect to the horizontal is no more than about 45 degrees. This is to provide an anchoring system with vertical stability and without tending to pull the anchoring points out of their holes in the water bed.

Preferably, an angle of inclination of the anchoring cables from the water bed and with respect to the horizontal is no less than about 10 degrees. More preferably, an angle of inclination of the anchoring cables from the water bed and with respect to the horizontal is no less than about 15 degrees. This is to provide an anchoring with horizontal stability and which also provides clearance under the turbine support for water flow. This can reduce heave on the turbine support.

Preferably, an angle of inclination of the anchoring cables from the water bed and with respect to the horizontal is 30 degrees+/−15 degrees.

Preferably, at least one anchoring cable has integral resistance to shock and/or at least one anchoring cable is connected in series or in parallel with a damper.

Preferably, the anchoring cables are streamlined and/or equipped with vortex suppressants. This may reduce, or even eliminate, vortex induced vibration caused by water flow around the anchoring cables. It is also to reduce the hydrodynamic drag of the anchoring cables.

Preferably, each anchoring cable is anchored in a respective hole in the water bed.

According to another aspect of the present invention, there is provided, a submersible turbine assembly comprising at least one flowing-water driveable turbine for generating power from water flow, wherein the turbine assembly is positively buoyant in water, wherein the turbine assembly comprises an anchoring system arranged to provide a downward force to constrain the turbine assembly to a position of floating equilibrium against the upward force of the positive buoyancy of the turbine assembly, wherein the anchoring system comprises at least three anchoring cables anchorable to at least three mutually spaced points on a water bed covering a footprint greater in width and in length than the turbine assembly. A turbine assembly embodying this aspect has an anchoring system with at least a tripod formation of three anchoring cables which provides sufficient stability to constrain a positively buoyant turbine assembly to a position of floating equilibrium against the upward force of the of the turbine assembly and against drag forces caused by water current flowing past the turbine assembly. Advantageously, inherent flexibility in the anchoring cables can absorb impacts against the turbine assembly or its rotors. Additional stability can be provided by additional anchoring cables without diminishing the anchoring system's ability to absorb shocks.

The top third of the water column (i.e. the optimal position for power extraction) in a deep water site (i.e. 40 m depth or more) is inaccessible to a traditional anchoring system, such as gravity anchors or columns driven into sea bed, due to increased overturning moment cause by water current drag forces. The top third of the water column is accessible to the turbine assembly of the present invention, even at deep water sites, by simply varying the length of the anchoring system's anchor cables. Advantageously, inherent flexibility in the anchoring cables permits an increase in divergence from the turbine assembly. This may widen and lengthen the anchoring system's footprint and, in doing so, increase stability to counteract any increased overturning moment experienced by the turbine assembly at a greater elevation above the water bed.

Preferably, each anchoring point on the water bed is attachable to two mutually spaced attachment points on the turbine assembly.

Preferably, each of the two mutually spaced attachment points on the turbine assembly are mutually spaced in at least a direction of upward force of the positive buoyancy.

Preferably, each anchoring cable couples each of the two mutually spaced attachment points on the turbine assembly to a single anchoring point on the water bed, wherein each anchoring cable comprises a mooring line to constrain the turbine assembly against the upward force of the positive buoyancy of the turbine assembly, wherein each anchoring cable comprises a tag line to provide directional support to the turbine assembly and wherein the tag line branches from the mooring line.

According to an aspect of the present invention, there is provided an anchoring cable for an anchoring system of a positively buoyant turbine assembly in water, wherein the anchoring cable comprises a helical protrusion arranged about the circumference of the anchoring cable to provide a vortex suppressant. Vortex induced vibration may become apparent after an anchoring system is installed in water with water currents. Advantageously, the anchoring cable of the present invention avoids the need to retrofit a vortex suppressant system or device in order to reduce vortex induced vibration, wandering and hydrodynamic drag caused by water flow around the anchoring cable.

Preferably, the anchoring cable is woven and wherein the helical protrusion is woven into the anchoring cable. This integrates production of the helical protrusion into the weaving process used to make the cable.

Alternatively, the helical protrusion is bonded to the anchoring cable. This integrates production of the helical protrusion into the cable manufacturing process.

Preferably, the helical protrusion and the anchoring cable are made of the same material. This economises on use of materials.

Preferably, the pitch of the helical protrusion is no more than sixteen times the diameter of the anchoring cable. More preferably, the pitch of the helical protrusion is no more than twelve times the diameter of the anchoring cable.

Preferably, the pitch of the helical protrusion is no less than four times the diameter of the anchoring cable. More preferably the pitch of the helical protrusion is no less than eight times the diameter of the anchoring cable.

Preferably, the pitch of the helical protrusion is between eight and twelve times the diameter of the anchoring cable. This may optimise the vortex suppressing properties of the helical protrusion.

Preferably, the outer diameter of the helical protrusion is no more than 200% of the diameter of the anchoring cable. More preferably, the outer diameter of the helical protrusion is no less than 110% of the diameter of the anchoring cable.

Preferably, the outer diameter of the helical protrusion is between 135% and 175% of the diameter of the anchoring cable. This may optimise the vortex suppressing properties of the helical protrusion.

Preferably, the anchoring cable is made of nylon, polypropylene and/or polyethylene material. These materials are suitable for cables or ropes used under tension and they do not corrode.

According to an aspect of the present invention, there is provided a turbine assembly comprising at least one flowing-water driveable turbine for generating power from water flow, wherein the turbine assembly has a variable positive buoyancy in water and the turbine assembly is arranged to be anchored by an anchoring system to anchoring points on a water bed, wherein the positive buoyancy of the turbine assembly is variable between a first upward force and a second upward force greater than the first upward force, and wherein the first upward force is sufficient to constrain the turbine assembly to a position of floating equilibrium against a downward force of an anchoring system. The positive buoyancy can be reduced when the turbine assembly is to be submerged. Then, the positive buoyancy can be increased upon arrival at the target location where a greater uplift force is required to stiffen the anchoring system. This helps to reduce effort needed to submerge the turbine assembly to its target location. Advantageously, a smaller winch with a smaller pull line may be used to perform the submerging process. Alternatively, a remote operated vehicle may be used instead which can perform the submerging process more quickly against less positive buoyancy. Variable positive buoyancy presents the operator with advantageous flexibility.

Preferably, the turbine assembly further comprises a turbine support arranged to be anchored by said anchoring system to a water bed and wherein the at least one turbine is secured to the turbine support. The turbine support provides capacity for storage of buoyancy devices.

Preferably, the turbine support has a variable positive buoyancy in water variable between the first positive buoyancy and the second buoyancy. This avoids the need to attach buoyancy to the at least one turbine.

Preferably, the turbine assembly further comprises a ballast tank fillable a positive buoyancy medium. The ballast tank may be filled with air or another positive buoyancy medium from a surface vessel, a remote operated vehicle or from compressed air stored on board the turbine assembly to provide a readily controllable means of adjusting positive buoyancy.

Preferably, the turbine assembly further comprises means for converting water current into hydrodynamic lift to provide an upward force on the turbine assembly. This may provide a passive upward force in addition, or as an alternative, to any active upward force provided by devices such as a ballast tank fillable with air.

Preferably, the means for converting water current into hydrodynamic lift comprises at least one hydrofoil. The or each hydrofoil may be attached to the turbine assembly during manufacture.

Preferably, the hydrodynamic lift is variable. This may increase positive buoyancy in proportion to an increase in surrounding water current speed to progressively counteract any drag moment created by longitudinal drag.

Preferably, the or each turbine comprises a turbine module having a duct for directing water through the turbine. A duct may shield the turbine from turbulence caused by any adjacent turbines or wave action and to increase efficiency of energy extraction from the water current Preferably, hydrodynamic lift and/or variable buoyancy in combination with the fixed buoyancy of the turbine assembly is sufficient to counteract the downward component of drag caused by water current flowing past the turbine assembly acting around the anchor points of the anchoring system so that the turbine assembly resists movement with change in water flow.

Preferably, the hydrodynamic lift and/or variable buoyancy of the turbine assembly acting against the downward force of the anchoring system is sufficient to counteract excursion of the turbine assembly from a target position of more than double the length of the turbine assembly with a water current at maximum target speed and/or maximum target wave height. More preferably, the hydrodynamic lift and/or variable buoyancy of the turbine assembly acting against the downward force of the anchoring system is sufficient to counteract excursion of the turbine assembly from a target position of more than the length of the turbine assembly with a water current at maximum target speed and/or maximum target wave height.

Preferably, the hydrodynamic lift and/or additional buoyancy of the turbine assembly acting against the downward force of the anchoring system is sufficient to counteract excursion of the turbine assembly from a target position of more than double the height of the turbine assembly with a water current at maximum target speed and/or maximum target wave height. More preferably, the hydrodynamic lift and/or additional buoyancy of the turbine assembly acting against the downward force of the anchoring system is sufficient to counteract excursion of the turbine assembly from a target position of more than the height of the turbine assembly with a water current at maximum target speed and/or maximum target wave height.

Preferably, uplift provided by the hydrodynamic lift and/or variable buoyancy of the turbine assembly is no more than 400% of the uplift provided by the fixed buoyancy of the turbine assembly.

Preferably, uplift provided by the hydrodynamic lift and/or additional buoyancy is no less that 80% of the uplift provided by the fixed buoyancy of the turbine assembly.

Preferably, maximum net upward force of positive buoyancy is no more than 150% of the weight of the turbine assembly in air. More preferably, maximum net upward force of positive buoyancy is no more than 100% of the weight of the turbine assembly in air. Still more preferably, maximum net upward force of positive buoyancy is no more than 50% of the weight of the turbine assembly in air. By minimising the net upward force of positive buoyancy smaller diameter anchoring cables may be used. This may reduce the weight of the anchoring system. Also, tension in the anchoring cables may be reduced thereby reducing forces acting upon the anchoring points.

Preferably, the first upward force is provided by a fixed buoyant material attached to the turbine assembly. This may ensure that the turbine assembly always has some degree of positive buoyancy. It may be towed on the water surface to an installation site without external intervention. A degree of positive buoyancy aids control while the turbine assembly is being submerged According to an aspect of the present invention, there is provided a turbine assembly comprising at least one flowing water driveable turbine for generating power from water flow, wherein the turbine assembly has a positive buoyancy in water, wherein the turbine assembly is arranged to be anchored by an anchoring system to a water bed, wherein the turbine assembly comprises at least one winch each with a respective pull line connectable to the anchoring system, and wherein the or each winch is operable to pull the turbine assembly towards the water bed by tensile forces acting through the pull line and wherein the or each winch is lockable against tensile forces acting through the pull line, wherein the positive buoyancy of the turbine assembly in water has an upward force to constrain the turbine assembly to a position of floating equilibrium against a downward force of an anchoring system. Conditions at sea, in rivers and in estuaries can vary significantly and quickly. Water currents can change direction. These environmental factors present challenges when installing a large object such as a turbine assembly under water. Advantageously, the winch of the present invention provides the turbine assembly with means of self-propulsion which may submerge it directly to its installation site, despite unfavourable environmental conditions of the surrounding water, where it can be locked by the winch in at the target location. This also avoids the need for a large surface vessel with a heavy lifting crane to submerge the turbine assembly to it installation site or subsequently retrieve it. This may eliminate problems associated with the motion of the surface vessel pulling in an unpredictable manner on the turbine assembly.

Preferably, the positive buoyancy of the turbine assembly is variable. The positive buoyancy can be reduced when the turbine assembly is being submerged. Then, the positive buoyancy can be increased when the target location is reached and a greater uplift force is required. This helps to reduce tension in the pull lines and minimise effort required on the part of the winch, or winches, during submerging process. Smaller diameter anchoring cables may be used if these also perform the role of pull lines.

Preferably, the or each winch is operable externally. This economises on the weight and expense of having a motor permanently coupled to the winch.

Alternatively, the or each winch is operable by an electric motor coupled thereto and wherein the electric motor is controllable remotely. This makes the turbine assembly fully self-propelled Preferably, the or each winch is operable by a remote operated vehicle coupled thereto.

Preferably, the turbine assembly has variable positive buoyancy. The turbine assembly may have increased positive buoyancy during towing and in use and the turbine assembly may have reduce positive buoyancy while being submerged to its installation site thereby reducing the load on the or each winch.

Preferably, the at least one winch comprises at least three winches each with a pull line for connection to a part of a respective anchoring cable of the above mentioned anchoring system having at least three anchoring cables. This may provide the turbine assembly with means of self-propulsion directly to its optimal position at the installation site. Advantageously, the three winches may be used to vary the position (i.e. pitch or roll) of the turbine assembly.

Preferably, each pull line is integrally connected to a part of a respective anchoring cable. This anchoring cables double-up as pull lines thereby making economic use of material.

According to another aspect of the present invention, there is provided a turbine assembly comprising a turbine support with positive buoyancy in water, wherein the turbine support is arranged to be anchored by an anchoring system to a water bed and a plurality of turbine modules each with positive buoyancy in water, wherein each turbine module is secured to the turbine support, wherein the combined positive buoyancy of the turbine support and the turbine modules in water has an upward force to constrain the turbine support and the turbine modules to a position of floating equilibrium against a downward force of an anchoring system, wherein each turbine module has a duct and a flowing-water driveable turbine mounted in the duct, wherein the duct is for directing water through the turbine and the turbine is for generating power from water flow.

An advantage of the present invention is that the turbine assembly can accept any type of flowing-water driveable turbine (i.e. axial flow turbine or cross flow turbine) once it is fitted to a turbine module. This means that, if desired, different turbines from different manufacturers, can operate alongside each other without modification to the turbine support. This improves flexibility in repair and maintenance and reduces cost, time and energy.

In a variant of the present invention, the modular turbine assembly may comprise only one turbine module. This would typically be when the turbine module assembly is used for testing or prototyping, although there may be other reasons, like, for example, when all but one of the turbine modules have been detached from the turbine support for maintenance or repair.

Water generally flows in one direction in a river whereas tidal flow at sea generally causes water flow in two directions. Preferably, the turbine is driveable by water flowing in either direction through the duct. This has the advantage that the turbine assembly is able to harness the kinetic energy of unidirectional river water flow or bidirectional tidal water flow at sea.

The duct reduces the effects of change in tidal flow angle, off-axis water flow and wave interaction by straightening and aligning water flow with the axis of the turbine. Preferably the duct defines a hollow generally cylindrical bore, wherein the turbine is a horizontal axis turbine with a rotor co-axial with the duct, and wherein the rotor is matched to the internal diameter of the duct.

Preferably, the duct is in fluid communication with a flared annular section at each end of the duct and wherein each flared annular section tapers towards the duct. Depending on the water flow direction, the down-flow flared annular section scoops water into the duct and the other emits water. This can increase water flow through the duct.

Preferably, the flared annular sections are mounted upon the turbine support. This can reduce the size, weight and complexity of the turbine modules.

Preferably, boundaries between the duct and the flared annular sections have at least one gap to promote water flow augmentation around where water flows into the flared annular section down-flow from the duct. This reduces water eddies by re-establishing a boundary layer connection between water flow and the diffuser i.e. the down-flow flared annular section. A reduction in water eddies is beneficial because it may reduce parasitic energy losses and drag. The at least one gap may be one gap or a series of gaps or slots.

Preferably, the at least one gap is an annular gap. This can promote water flow augmentation around the whole circumference of the diffuser i.e. the down-flow flared annular section Preferably, each flared annular section has an array of transverse vanes. The vanes help prevent ingress of marine flora, fauna and debris and guide such objects clear of the duct. The vanes help straighten the water flowing into the turbine.

Preferably, the turbine module is streamlined to reduce interaction with upward and downward wave motion in the water surrounding the turbine module. Wave motion, particularly upward and downward wave motion, can put significant force on the anchoring system of a turbine assembly and, over time, can damage or weaken the anchoring system. This is especially so when the turbine assembly is under load of tidal flow. Interaction with wave motion is to be reduced as much as possible by, for example, anchoring the turbine assembly in deep water i.e. 40 m of water. Streamlining the turbine modules has the advantage of further reducing wave interaction by presenting a decreased horizontal cross-sectional area.

Preferably, each turbine module is detachably docked with the turbine support. All of the turbine assembly's components can be floated to an anchorage site where they are assembled. The turbine support is submerged and permanently anchored to the water bed. The turbine modules are submerged to detachably dock with the turbine support where they remain until maintenance, repair or replacement is needed. In that event, one turbine module may be floated to the water surface without need of disturbing the rest of the turbine assembly. This saves time, energy and cost. If maintenance or repair is unexpectedly protracted a decision to substitute the defective turbine module can be taken quickly and efficiently. Moreover, if a substitute turbine module is not available then the defective turbine module can be returned to harbour while the rest of the turbine assembly continues to operate uninterrupted.

Preferably, the positive buoyancy of the turbine module is localised above and below the duct. The turbine module can float on its side with an increased horizontal cross-sectional area because the streamlined profile naturally lies flat upon the water surface. This improves stability, and reduces the draft, of the turbine module when it is being towed in water.

Preferably, the turbine module is elongate in the direction of water flow through the duct and wherein an external surface of the turbine module has a generally elliptical transverse cross-sectional profile. An elliptical profile is an example of a streamlined profile that helps to reduce interaction with upward or downward wave motion by presenting a decreased horizontal cross-sectional area.

Preferably, the turbine is removable through a removable side of the turbine module. Complete access to the turbine in open water, and even removal of the turbine by floating crane, may be highly beneficial in saving time, energy and cost in repair or maintenance to the turbine module.

Preferably, each turbine module is adapted to dock with the turbine support in a positive location arrangement. This has the advantage of automating the docking process because the turbine module finds its own docking location as it is lowered into the turbine support. The process may be further automated by latches to fix the turbine module docked to the turbine support. Alternative fixing means, like, for example, a lock or a pin may be employed.

Preferably, the turbine support is adapted to dock with three to five turbine modules.

Preferably, the positive buoyancy of the support structure and/or the turbine module is variable. The buoyancy of the support structure or turbine module may be reduced to facilitate submerging, especially if a remote operated vehicle is to be used instead of a winch. When the turbine support or the turbine module is assembled with the turbine fully assembly the buoyancy may be increased to stiffen the anchoring system. Variable buoyancy presents the operator with advantageous flexibility.

According to another aspect of the present invention, the turbine support is provided separately for assembly with the modular turbine assembly.

According to another aspect of the present invention, the turbine module is provided separately for assembly with the modular turbine assembly.

According to another aspect of the present invention, a method of assembling the modular turbine assembly in open water comprises the steps of: towing the turbine support to an anchorage site; anchoring the turbine support to a water bed with an anchoring system; towing the plurality of turbine modules to the anchorage site; submerging one of the turbine modules to dock with the turbine support; and repeating the last step until the full complement of turbine modules is docked with the turbine support.

The depth of the turbine assembly depends on turbine size and the conditions of the anchoring site. The minimum submerged depth could be 1 m in a river or in a sheltered position. In certain conditions the depth may be less than 1 m whereby the turbine support is not entirely submerged. Preferably, the method of assembling a modular turbine assembly comprising an additional step of submerging the turbine support between steps of towing it and anchoring it.

Preferably, the last step of the method of assembling a modular turbine assembly in open water is performed by force of a winch with at least one pull line and wherein the winch is mounted upon the turbine support. This is a reliable way of ensuring the turbine module docks with the turbine assembly.

Alternatively, the last step of the method of assembling a modular turbine assembly in open water is performed by force of a remote operated submergible vehicle. This is a suitable alternative if a winch is not fitted to the turbine support, or it is inoperable.

Preferably, the positive buoyancy of the turbine module is reduced when submerged by a remote access vehicle and increased after docked with the turbine support. This makes it easier for the remote access vehicle to submerge the turbine module.

Preferably, the method of assembling a modular turbine assembly in open water is performed with the anchoring system described above due to its inherent resistance to heave under water flow.

According to another aspect of the present invention, a method of repair or maintenance to the modular turbine assembly comprises the steps of tethering one of the turbine modules for controlled floatation to the water surface; detaching the turbine module from the turbine support; floating the turbine module to the water surface; and performing repair or maintenance work upon the turbine module or submerging a substitute turbine module to dock with the turbine support.

Preferably, the method of repair or maintenance to a modular turbine assembly is performed by force of a winch with at least one pull line wherein the winch is mounted upon the turbine support. This is a reliable way of ensuring the turbine module docks with the turbine assembly.

Alternatively, the method of repair or maintenance to a modular turbine assembly is performed by a remote operated submergible vehicle. This is a suitable alternative if a winch is not fitted to the turbine support, or it is inoperable.

Preferably, the positive buoyancy of the turbine module is reduced when submerged by a remote access vehicle and increased after docked with the turbine support. This makes it easier for the remote access vehicle to submerge the turbine module.

According to another aspect of the present invention, the turbine support may be provided by towing the turbine support to an anchorage site and anchoring the turbine support to a water bed with an anchoring system, preferably the anchoring system described above.

According to another aspect of the present invention, the turbine module may be provided by towing the turbine module to the anchorage site and submerging the turbine modules to dock with the turbine support.

According to another aspect of the present invention, there is provided a turbine assembly comprising at least one flowing-water driveable turbine for generating power from water flow, wherein the turbine assembly positive buoyancy in water and the turbine assembly is arranged to be anchored by an anchoring system to a water bed, wherein the or each turbine is mounted in a respective duct, wherein the duct is for directing water through the turbine and the turbine is for generating power from water flow, and wherein the duct is in fluid communication with a flared annular section at an end of the duct and wherein the flared annular section tapers inwardly towards the duct. The flared annular section helps to direct water current towards the duct thereby concentrating water flow past the turbine and increasing energy extraction. Alternatively, the flared annular section may act as a diffuser to direct water flow from the duct.

Preferably, a boundary between the duct and the flared annular section has at least one gap. This may reduce water eddies by re-establishing a boundary layer connection between water flow and the duct or flared annular section down-flow of the gap. A reduction in water eddies is beneficial because it may reduce parasitic energy losses and drag. The at least one gap may be one gap or a series of gaps or slots.

Preferably, the at least one gap is an annular gap. This may promote water flow augmentation around the whole circumference of the flared annular section.

Preferably, the duct is in fluid communication with a second flared annular section at a second opposite end of the duct and wherein the flared annular section tapers inwardly towards the duct. The first flared annular section can act as a concentrator of water flow through the duct while the second flared annular section can act as a diffuser of water flow from the duct, and vice versa depending on water flow direction.

Preferably, a boundary between the duct and the second flared annular section has at least one gap. This may reduce water eddies by re-establishing a boundary layer connection between water flow and the duct or second flared annular section down-flow of the gap. A reduction in water eddies is beneficial because it may reduce parasitic energy losses and drag. The at least one gap may be one gap or a series of gaps or slots.

Preferably, the at least one gap is an annular gap. This may promote water flow augmentation around the whole circumference of the second flared annular section.

Preferably, the or each turbine is driveable by water flowing in either direction through the duct. This has the advantage that the turbine assembly is able to harness the kinetic energy of unidirectional river water flow or bidirectional tidal water flow at sea.

Preferably, the duct defines a hollow generally cylindrical bore, wherein the turbine is a horizontal axis turbine with a rotor co-axial with the duct, and wherein the rotor is matched to the internal diameter of the duct.

Preferably, the positive buoyancy of the turbine assembly in water has an upward force to constrain the turbine assembly to a position of floating equilibrium against a downward force of an anchoring system, According to another aspect of the present invention, there is provided a method of submerging a turbine assembly having variable positive buoyancy in water, wherein the turbine assembly has at least one flowing water drivable turbine for generating power from water flow and at least one winch having a respective pull line connectable to an anchoring system, wherein the method comprises the steps of: a) floating the turbine assembly to an installation site; b) coupling the or each pull line to an anchoring system submerged in water; c) reducing the positive buoyancy of the turbine assembly; d) operating the or each winch to submerge the turbine assembly to a target location by force of tension in the or each pull line; and e) locking the or each winch upon arrival at the target site.

Embodiments of the turbine assembly, the anchoring system, and the anchoring cables of the present invention will now be described with reference to the drawings of which:

Figure 1:
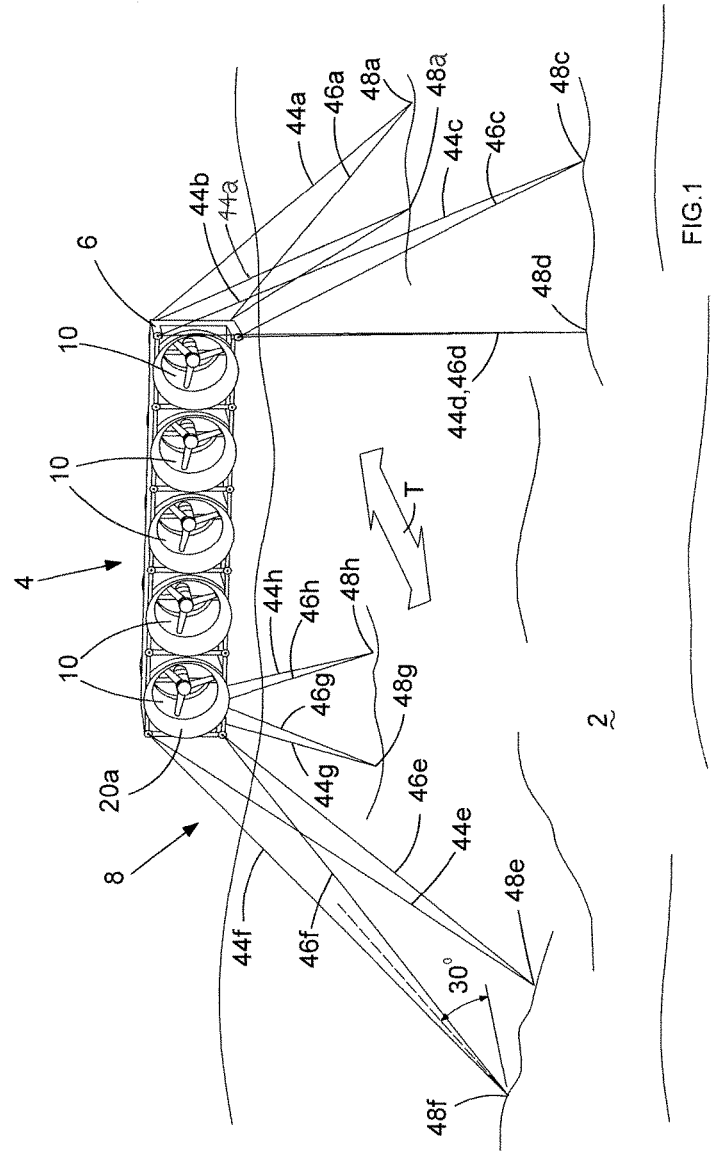
FIG. 1 is a perspective view of an embodiment of the modular turbine assembly of the present invention anchored to a sea bed.

Referring to FIG. 1, there is shown a sea bed 2 in a region of the sea where water flows in two directions due to tidal forces. Submerged in the water is a modular turbine assembly 4 which is for converting the kinetic energy of the flowing water into electrical energy and delivering it to a facility located on shore or offshore. The turbine assembly comprises a turbine support 6 which is positively buoyant in water and which is anchored to the sea bed by an anchoring system 8. The turbine assembly 4 has an array of five turbine modules 10 arranged in a line in the turbine support 6. Each turbine module 10 is positively buoyant in water. Each turbine module 10 is detachably docked to the turbine support 6. The combined positive buoyancy of the turbine support 6 and the five turbine modules 10 has an upward force which constrains them to a position of floating equilibrium against the downward force of an anchoring system 8.

As the turbine assembly of this embodiment is anchored at sea, a double-headed arrow T shows both directions in which the tidal forces cause the water to flow. The modular turbine assembly 4 is orientated with the array of five turbine modules 10 generally in line with arrow T so that as much water as possible flows through the turbine modules in a straight path.

The turbine assembly 4 is described as modular because the turbine modules 10 are interchangeable with each other and are docked to the in the support structure 6 in the same way.

Figure 2:
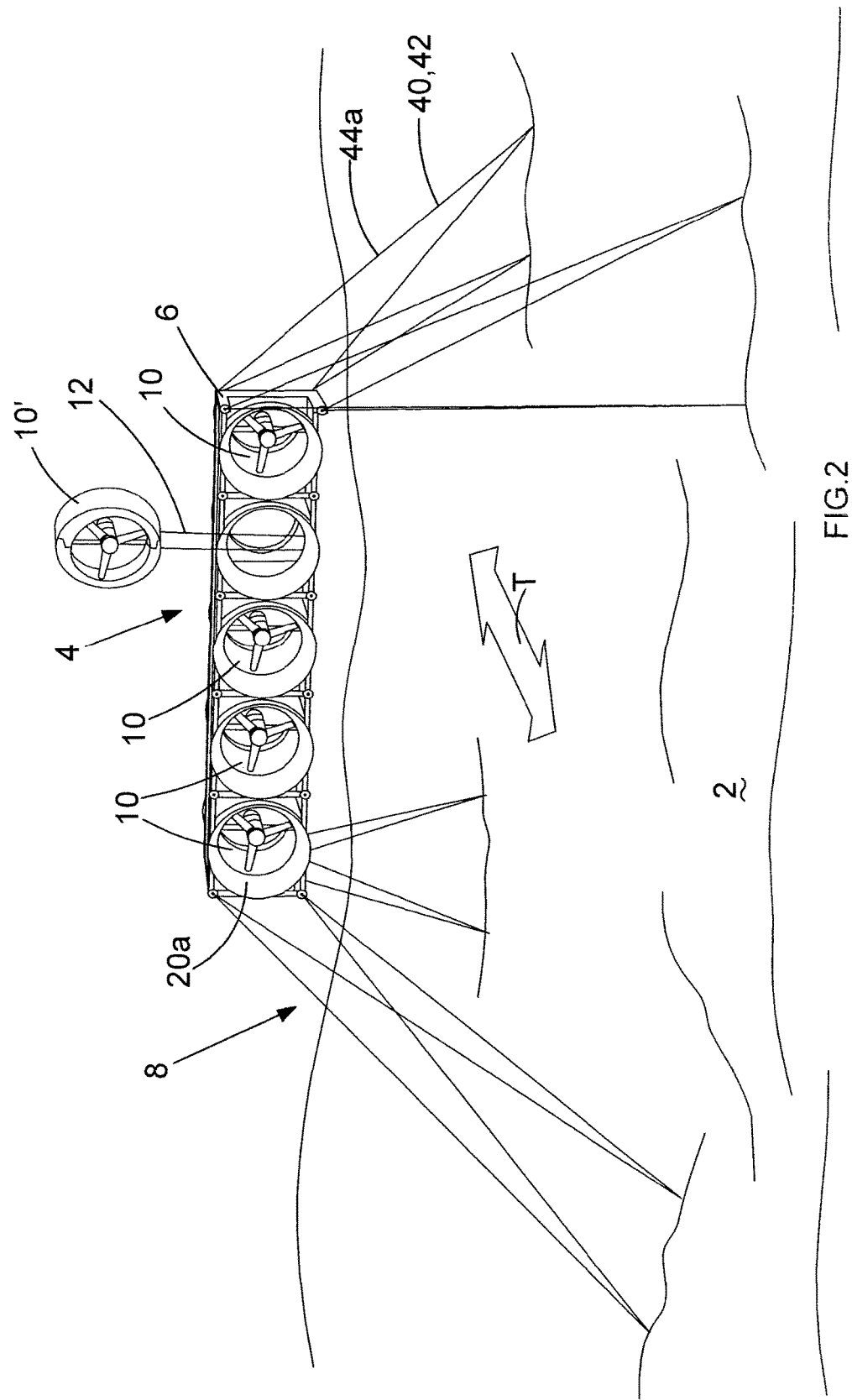
FIG. 2 is a perspective view a turbine module docking with a turbine support of the modular turbine assembly of FIG. 1.

Referring to FIG. 2, there is shown a turbine module 10' being pulled downward by a winch on the turbine support with two pull lines 12. The turbine module 10' docks with the turbine support 6. Once docked with the support structure, the turbine module 10' is anchored to the sea bed by the anchoring system unless, or until, at some time in the future the turbine module 10' is detached for maintenance, repair or replacement.

If, or when, maintenance, repair or replacement is required, the turbine module 10' is detached from the turbine support and allowed to float under its own inherent buoyancy in water to the surface. The assent of the turbine module 10' is controlled by the winch with two pull lines 12.

Alternatively, the winch with two pull lines can be substituted by a remote operated vehicle to perform the task of submerging the turbine module to dock with the turbine support. The remote operated vehicle can perform the task of controlled floatation of the turbine module to the surface too.

Figure 3:
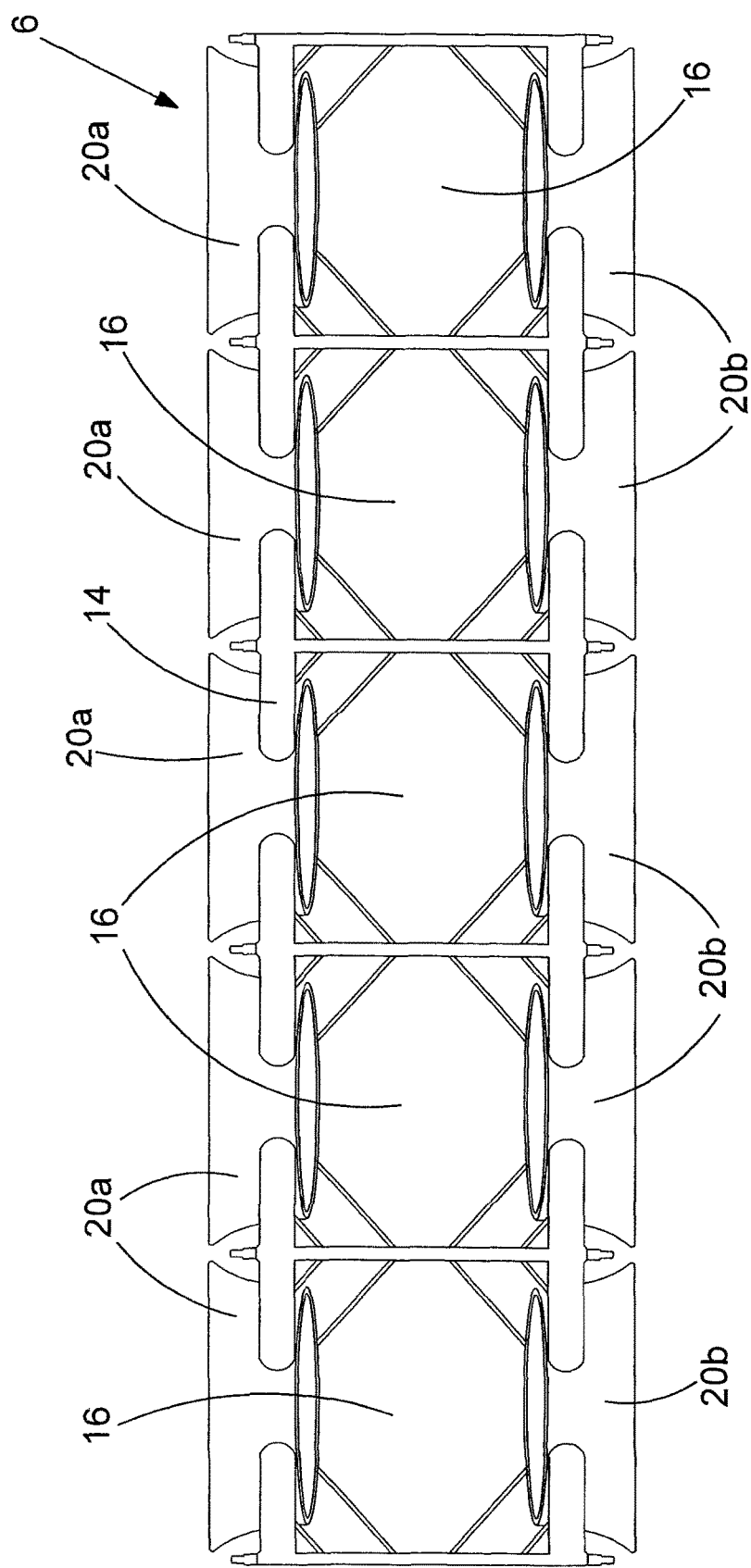
FIG. 3 is a plan view of the top of the turbine support.

Referring to FIG. 3, the turbine support 6 comprises a frame 14. The frame can be made of any material strong enough to support the turbine modules (i.e. steel, aluminium, fibre reinforced concrete, inflated material or composite). The frame has elements that are filled with buoyant material, or that are attached to buoyant material, to provide the positive buoyancy of the turbine support. The positive buoyancy may be adjusted by means of compressed air or buoyant gel or by another medium pumped from the surface or supplied by sub-sea reservoir. The positive buoyancy of the turbine support 6 is enough to be towed to the anchoring site.

The frame 14 is divided into five turbine module docking bays 16. Each docking bay 16 is accessible through the top of the frame to receive a respective turbine module 10. Each docking bay has a pair of flared annular sections 20a, 20b connected to the frame 14 of the turbine support 6. One flared annular section is located at each end of the docking bay. Each flared annular section tapers towards the docking bay.

Figure 4:
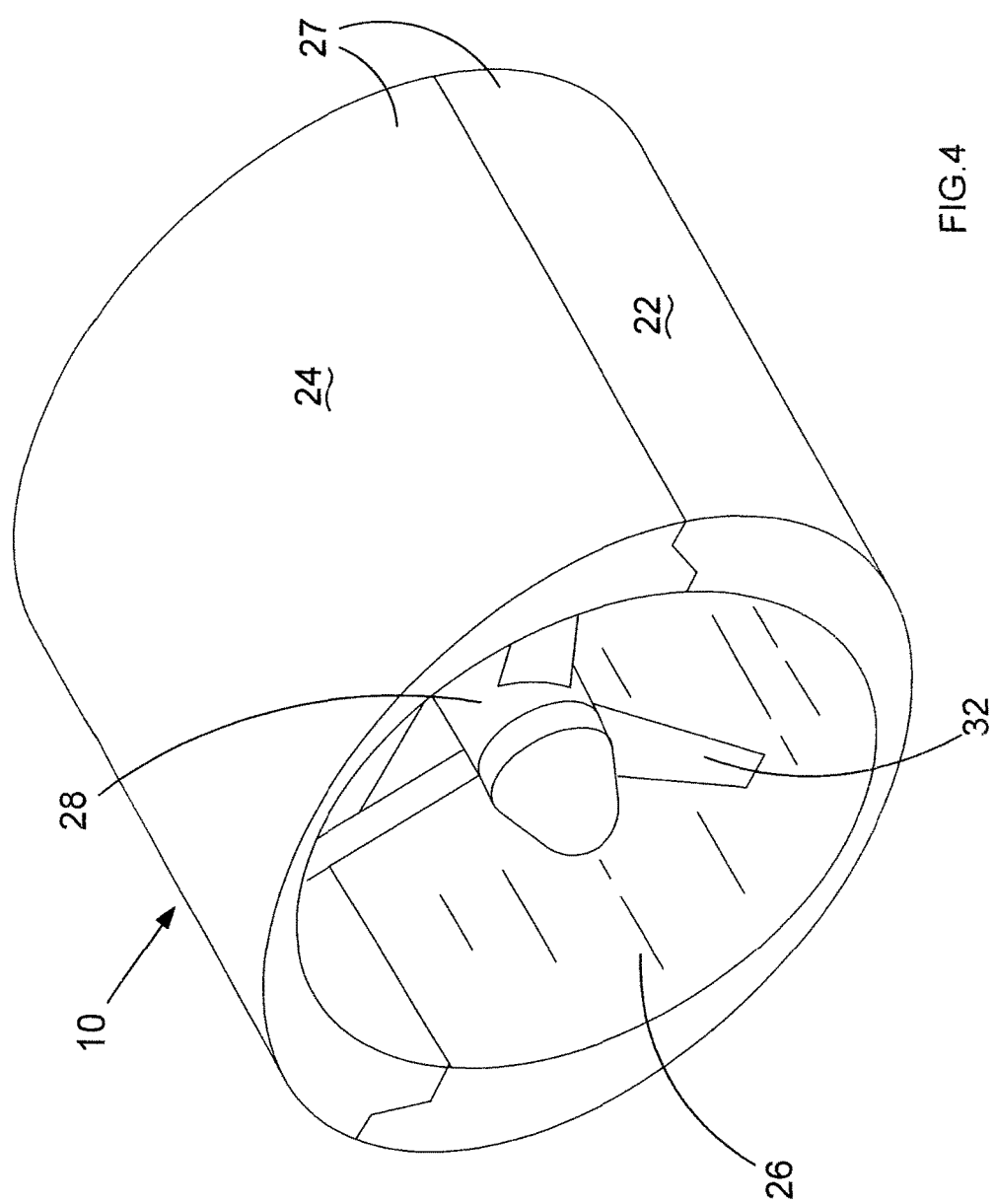
FIG. 4 is perspective view of the turbine module.
Figure 5:
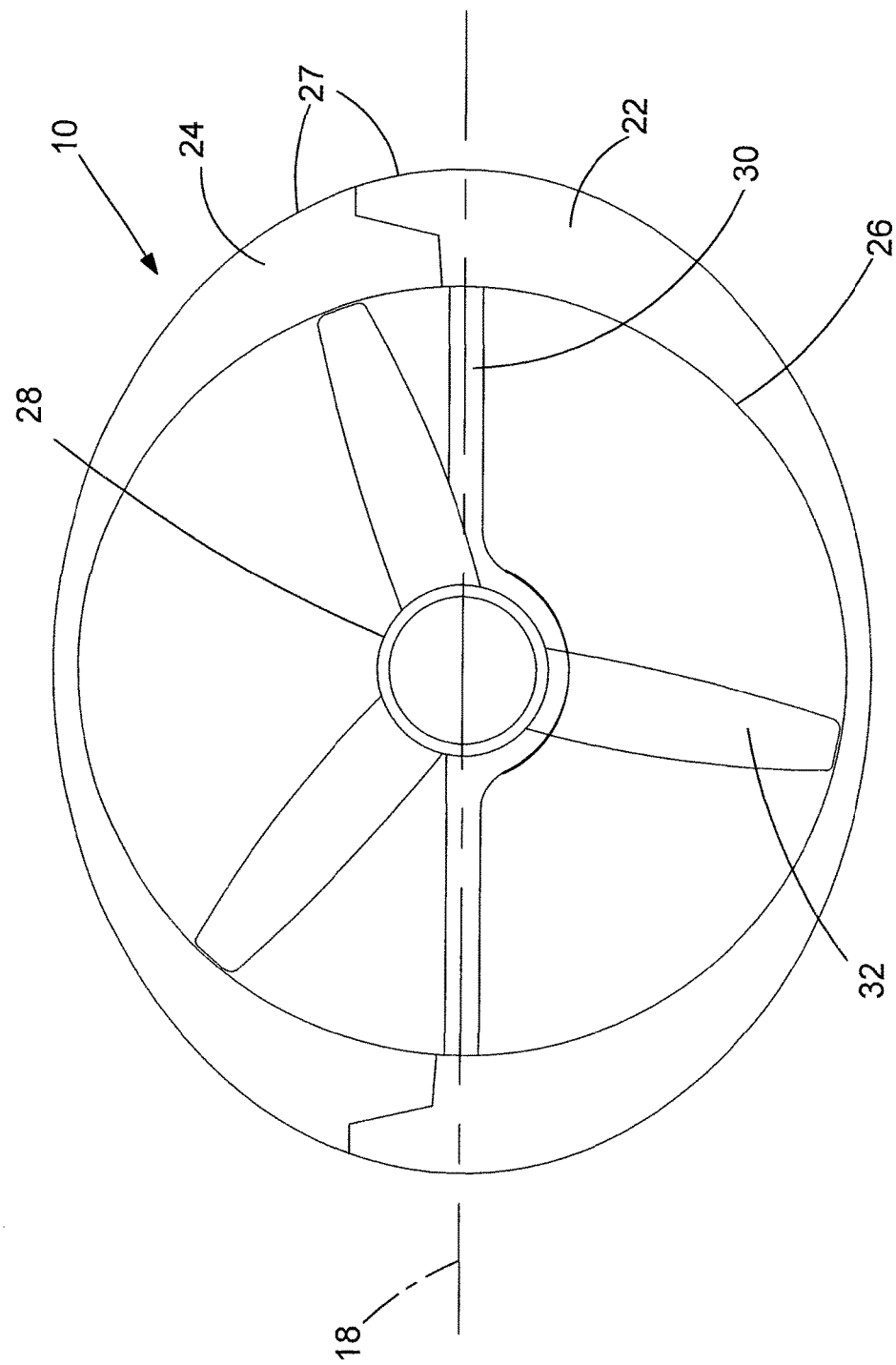
FIG. 5 is a front elevation view of the turbine module.

Referring to FIGS. 4 and 5, the turbine module 10 has a major body shell 22 and a minor body shell 24 joined to form a duct 26 which defines a hollow generally cylindrical bore. An external surface 27 of the joined minor and major body shells has a generally elliptical profile transverse the cylindrical bore of the duct. The body shells 24, 26 are filled with buoyant material (i.e. a fluid, solid or a combination of both), or are attached to buoyant material, to provide the positive buoyancy of the turbine module. The positive buoyancy of each turbine module 10 is enough to be towed to an anchoring site.

The turbine module 10 has a water-driveable horizontal axis turbine 28 mounted upon a bracket 30 inside the duct. The turbine has a rotor 32 co-axial with the duct. The rotor is matched to the diameter of the duct. The duct shields the turbine from turbulence caused by adjacent turbines so that the array of five turbine modules may be closely spaced. The turbine is driveable by water flowing in either direction through the duct and generates electrical power.

Returning to FIG. 2 in more detail, each turbine module 10 is docked with a respective docking bay 16 in a complementary locating arrangement which automatically orientates a major axis 18 of the elliptical profile of the external surface 27 in a generally upright position in the turbine support 6 where the turbine module is locked in place by a locking mechanism. This reduces the horizontal cross-sectional area of the turbine module. As a result, the turbine module is streamlined to reduce interaction with upward or downward wave motion in the surrounding water.

Electrical connections between the turbine modules 10 and the turbine support 6 are made before or after docking. The electrical power generated by the turbines varies with water flow rate. Each turbine module has electrical power equipment (not shown) for conditioning the electrical power generated by the turbines. The turbine support has electrical power management equipment (not shown) for combining the conditioned electrical power from the five turbine modules. The turbine support's electrical power management equipment includes a step-up transformer (not shown) for transmission of the generated electrical power to a shore, or offshore, facility via a power cable 40. A communication cable 42 from the turbine assembly accompanies the power cable.

Figure 6:
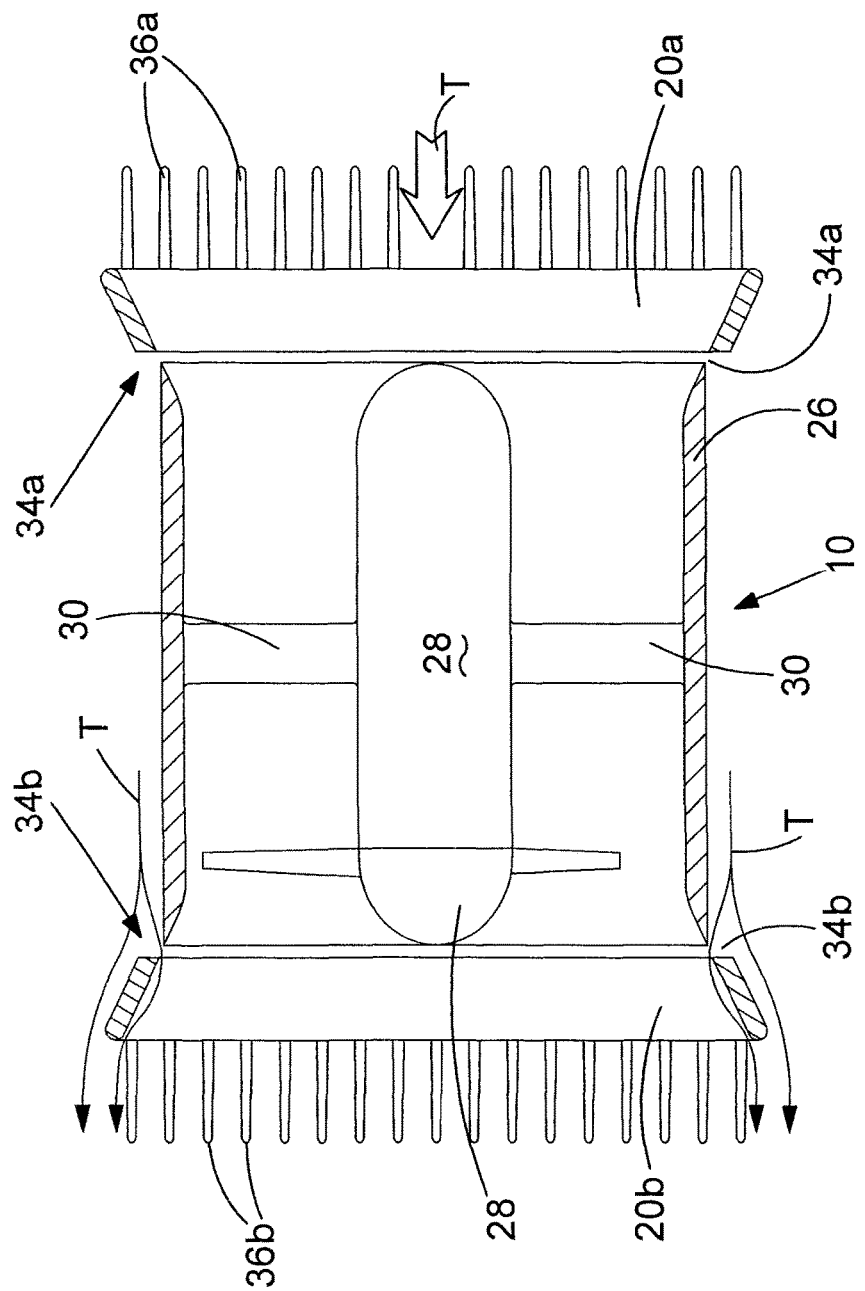
FIG. 6 is a cross-sectional view of the turbine module with a flared annular section at each end.

Referring to FIG. 6, there is shown the duct 26 in fluid communication with the pair of flared annular sections 20a, 20b when one of the turbine modules 10 is docked in one of the docking bays 16 of the turbine support 6. The annular sections are suited for bi-directional water flow. Single headed arrow T indicates a direction of water flow which results in the up-flow annular section 20a performing the role of concentrator to scoop water into the duct and the down-flow annular section 20b performing the role of diffuser to emit water from the duct. This situation will be reversed when the tide changes and water flows through the duct in the opposite direction and arrow T is reversed (i.e. annular section 20b becomes the concentrator and annular section 20a becomes the diffuser).

The geometry of the annular sections 20a, 20b is matched to the water flow requirements of the turbine. The annular sections may be made of steel, aluminium, fibre reinforced concrete, inflated material or composite. The annular sections are connected may contribute the positive buoyancy of the turbine support.

The boundaries between the duct 26 and the flared annular sections 20a, 20b each have an annular gap 34a, 34b. The gaps enable water flowing outside the turbine module to enter the diffuser (i.e. the down-flow annular section 20b in this example) by venturi effect. This promotes water flow augmentation which reduces water eddies by re-establishing a boundary layer connection between water flow and the diffuser. A reduction in water eddies is beneficial because it reduces parasitic energy losses and drag.

The ends of the flared annular sections 20a, 20b facing away from the duct 26 are each equipped with an array of transverse vanes 36a, 36b. The vanes help prevent ingress of debris into the duct and help straighten the water flowing into the turbine 28. The vanes induce a rotational flow into the water flow to increase the energy extraction of the turbine.

Figure 7A:
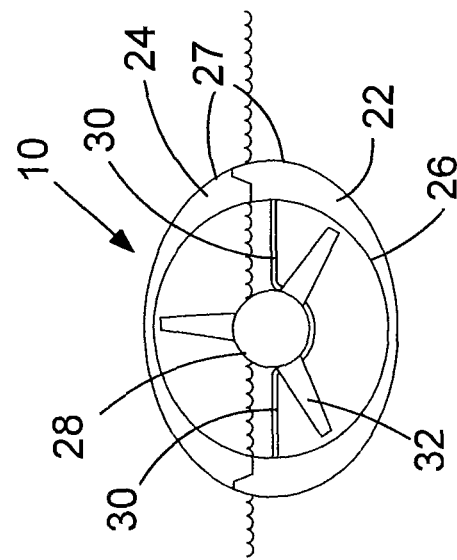
FIG. 7A to 7C show three stages of disassembling the turbine module.

Referring to FIG. 7A, the positive buoyancy of the turbine module 10 is localised about the major axis 18 of the elliptical external surface 27. As a result, the turbine module tends to float on the water surface with an increased horizontal cross-sectional area. This improves stability, and reduces the draft, of the turbine module when it is being towed at sea.

Figure 7B:
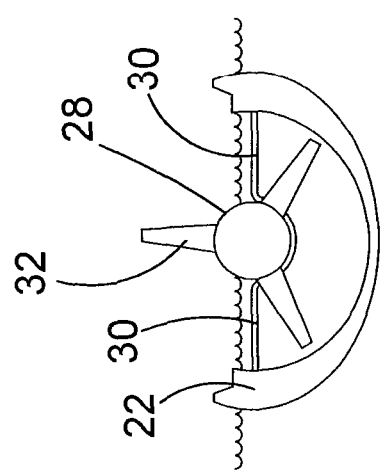
Figure 7C:
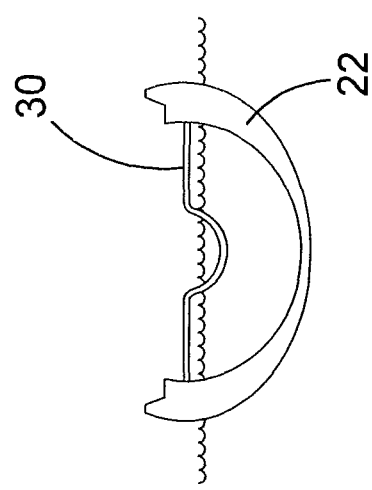

Referring to FIG. 7B, the major body shell 22 has positive buoyancy to enable removal of the minor body shell 24 while the major body shell and the turbine 28 remain afloat. Removal of the minor body shell allows complete access to the turbine, and even removal of the turbine by floating crane, for the purpose of repair or maintenance to the turbine module, as is shown by FIG. 7C.

Returning in more detail to FIG. 1, the anchoring system 8 comprises eight pairs of anchoring cables 44a, 46a-44h, 46h. Each pair of anchoring cables includes an upper anchoring cable 44 and a lower anchoring cable 46. Two pairs of anchoring cables are fixed to each corner edge of the frame 14 of the turbine support 6 (i.e. the upper anchoring cable of each pair is fixed to the corner edge above where the lower anchoring cable of each pair is fixed to the corner edge). The other ends of each pair of anchoring cables are permanently fixed to a respective anchor point 48a-48h on the sea bed.

The anchoring cables 44a, 46a-44h, 46h of each pair of anchoring cables converge from the frame 14 of the turbine support 6 to their respective anchoring points 48a-48h. The mean angle of inclination of the anchoring cables of each pair of anchoring cables with respect to the horizontal is approximately 30 degrees.

The anchor points 48a-48h are arranged about the turbine support 6 to suit the sea bed topography and to maintain the turbine support in a generally horizontal position. The anchor points cover a footprint greater in width and in length than the turbine support.

The upward force of the combined positive buoyancy of the turbine support 6 and the five turbine modules 10 cause tensile forces along the full length of the anchoring cables 44a, 46a-44h, 46h.

The anchoring cables may be (preferably high performance) synthetic rope, steel/wire rope, chain, solid metallic rod or solid composite rod.

The anchoring cables are equipped with vortex suppressants to reduce their hydrodynamic drag and reduce any vibration caused by water flow. For example, a vortex suppression system may be fibre or tape strands incorporated or attached to the anchoring cables. The fibre or tape strands stream with the water flow to form a fairing, or a hydrofoil. Rotating faired sections which fit over the anchoring cables and align with the water flow, spiral sections either fitted to or incorporated into the structure of the anchoring cable, or other proprietary vortex suppression systems are also suitable.

Returning to FIG. 2, the power cable 40 and the communication cable 42 from the turbine assembly are incorporated within the upper anchoring cable 44a.

The modular turbine assembly is assembled at sea by towing the turbine support to an anchorage site, submerging it, and anchoring it to the sea bed with the anchoring system where it remains permanently. The five turbine modules are towed to the anchorage and submerged, each one in turn, to dock with the turbine support.

To recap, the following are important features of at least some preferred embodiments of the present invention, and each can be provided independently or in different embodiments.

A tethered sub-sea installation base which, when populated with devices, in itself comprises a small array of horizontal axis Tidal Energy Convertors (TECs). The base is for use at deep water sites (over 40 msw) and enables the TECs to be positioned at the optimum depth dictated by the compromise between power output (strongest current found close to the surface) and adverse structural and flow influences from wave interaction. Alternatively, the base may be used at shallower sites where it is submerged very close to, or even slightly protruding above (provided the TECs are submerged), the water surface.

As an integral part of the design a method is disclosed of installing and retrieving the TECs using buoyant modules into which individual TECs are loaded. The loaded modules are then towed to site and connected to the sub-sea base electrically and via a pull in line. The module is pulled sub-sea by the pull in line and interfaces with and locks into the sub-sea base.

An alternative to the above method, the buoyant modules may be driven to and retrieved from the PMSS by means of a Remote Operated Vehicle (ROV) specifically designed for the purpose and having the required thrust capability. This may include the use of variable buoyancy within the buoyant module to reduce the quantity of thrust required to drive the module subsea.

The turbine support may be a permanently installed buoyant subsea structure PMSS comprising:

Structural space frame which may be of steel, aluminium or composite construction—the elements of which may be sealed to form pressure vessels, or may be filled with, surrounded by, or have attached buoyant material (including air or other gas) providing all or part of the buoyancy required to support the structure.

'Conical' diffuser and concentrator sections—the precise geometry of the concentrator and diffuser can be matched to the flow requirements of the TEC.

The diffuser and concentrator sections can be suited to bi-directional flow

The diffuser and concentrator sections can incorporate 'slots' to enable flow augmentation to re-establish boundary layer connection within the diffuser.

The diffuser and concentrator sections may be constructed from steel, aluminium, fibre reinforced concrete, inflated material (i.e. 'hyperlon' or similar), composite (i.e. glass or other fibre reinforced plastic).

The diffuser and concentrator sections may contribute to the buoyancy of the PMSS Buoyancy of the PMSS may be adjustable by means of compressed air or buoyant gel or other medium pumped from the surface or supplied from a subsea reservoir.

Step up transformer for transmission of generated electrical power to shore or offshore processing facility via power cable.

Power conditioning and switching equipment as required to combine and transmit the output of one or more tidal energy convertors as electrical power.

The anchoring system is a tension spread mooring system (TSM)

Sea-bed fixing points which may be drag anchors; gravity anchors; suction piles; pinned template structures; attachment to sub-sea geographical features;

Tension members which may be high performance synthetic rope such as UHMwPE (i.e. dyneema); steel/wire rope; chain; solid metallic rod (i.e. nitronic 50; 17-4 pH; 316 stainless steel etc.)

Vortex Induced Vibration (VIV) suppression system which may be fibre or tape strands incorporated or attached to the tension member which streams with the flow to form a fairing ('hairy' or 'ribbon' fairing); Rotating faired sections which fit over the tension member and align with the flow; Spiral sections either fitted to or incorporated into the structure of the tension member, or other proprietary vortex suppression system.

Power transmission cable incorporating power conductors and communications (i.e. fibre optic or conventional signal pair conductors)

The power transmission and communication cables may be incorporated into one or more of the tension members (i.e. the structural cable casing may act as tension member(s)).

The turbine module is a buoyant module (BM)

Parallel annular duct matched to TEC to reduce the effects of off axis flow and wave interaction by straightening and aligning current flow with the TEC axis.

Once installed the BM Integrates with the 'conical' diffuser and concentrator sections (which form part of the PMSS) to enhance performance over that achievable in open ocean conditions.

BM's installed into the subsea structure by sub-sea pull in lines, buoyancy control or a combination of the two.

The BM has an elliptical (or otherwise non-circular) distribution of volume to reduce the horizontal area presented to wave motions, and to give stability when on the surface.

The BM can contain power conditioning equipment as required for each individual TEC to enable the power produced to be fed to the centralised step up transformer for onward transmission.

The BM can be split to allow installation of the TEC by means of overhead crane. This minimises the crane capacity required.

Power for Sub-Sea Operations:

Power to drive the subsea winches may be provided by equipment permanently or temporarily fitted to the sub-sea structure, or may be provided by means of an umbilical connection from a surface ship, or by specially equipped Remote Operated Vehicle (ROV).

Protection against object ingress. Vanes on the concentrator and diffuser may provide some or all of the following functions:

Prevent the ingress of marine fauna, flora and flotsam/debris

Guide objects clear of the duct and sub-sea structure

Further straighten the flow into the turbine blades

Induce counter rotational flow into the water stream to increase the energy extraction potential.

The vanes are not a fundamental part of the design but may have significant efficiency benefits if considered as part of the turbine design as it may allow significantly higher rotor speeds and therefore lighter, lower cost generators. The design of the vanes may simply look similar to two traditional 'cow catchers', mirrored and joined on the centre-line to form an inlet guard—one such unit at each end to catch and guide any objects clear of the inlet to the turbine duct.

Figure 8:
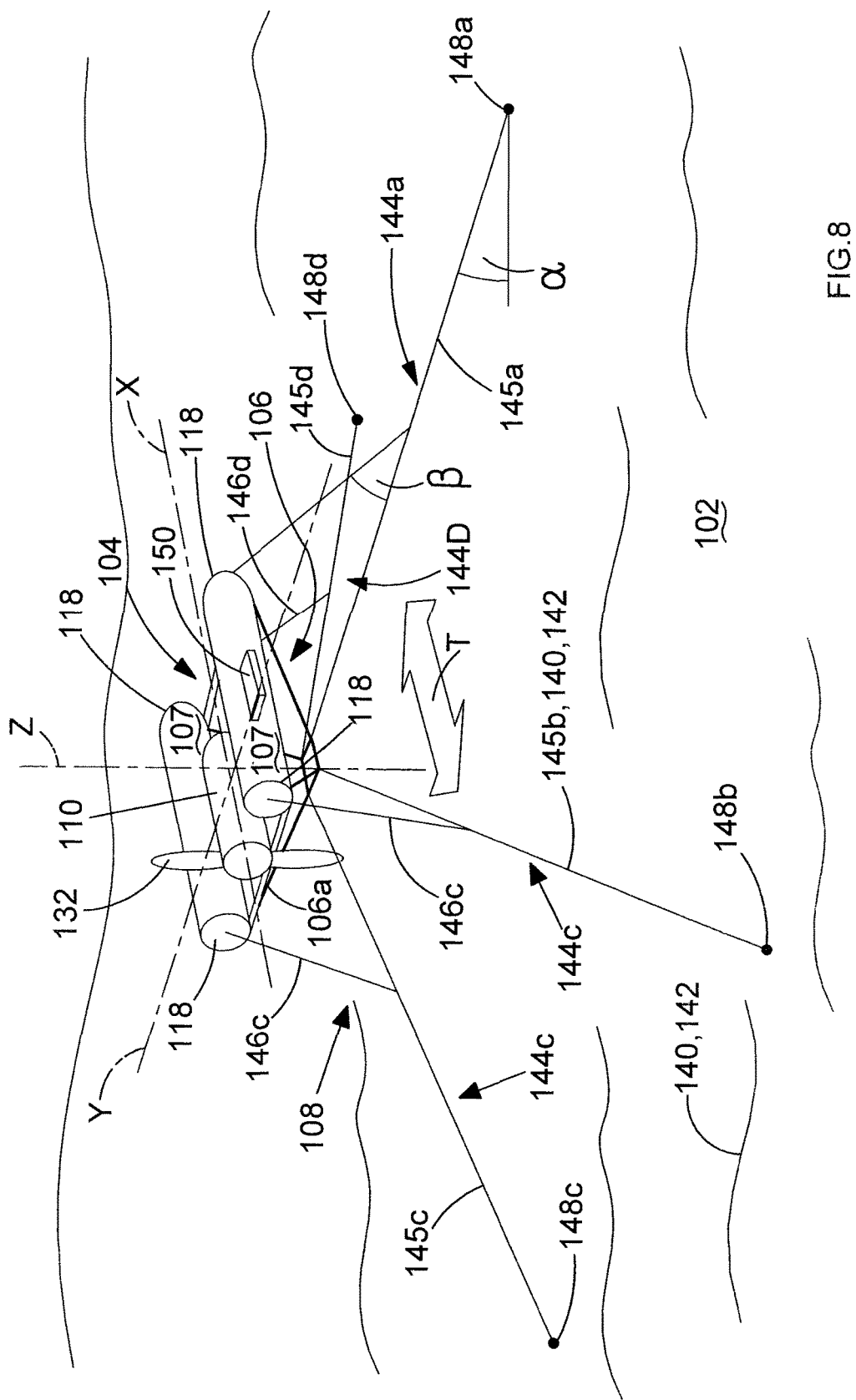
FIG. 8 is a perspective view of an embodiment of a turbine assembly anchored to a sea bed by an anchoring system.

Referring to FIG. 8, there is shown a sea bed 102 in a region of the sea where water flows in two directions due to tidal forces. Submerged in the water is a turbine assembly 104 which is for converting the kinetic energy of the flowing water into electrical energy and delivering it to a facility located on shore or offshore. The turbine assembly comprises a turbine support 106 which is anchored to the sea bed by an anchoring system 108. The turbine assembly 104 has a single turbine 110 secured to the turbine support 106. The turbine support 106 comprises a frame 106a and a pair of buoyancy devices 107 located at opposite ends of the frame 106a for stability.

The turbine 110 is secured to the frame 106a between the buoyancy devices 107. The turbine is located approximately midway between the buoyancy devices to minimise instability about the X axis of the turbine assembly which passes through the central axis of the turbine. Optionally, the turbine 110 may be detachable and interchangeable with other turbines.

The turbine support 106 has positive buoyancy in water which is variable by virtue of the buoyancy devices 107, as is explained in more detail below. Optionally, the turbine 110 may have variable positive buoyancy in water. The combined positive buoyancy of the turbine assembly 104 in water has an upward force which constrains it to a position of floating equilibrium against the downward force of the anchoring system 108.

As the turbine assembly of this embodiment is anchored at sea, a double-headed arrow T shows both directions in which the tidal forces cause the water to flow. The turbine assembly 104 is orientated with axis X through the turbine 110 generally in line with arrow T so that as much water as possible flows through the turbine in a straight path. The buoyancy devices 107 are streamlined and elongate in the direction of axis X of the turbine assembly to minimise hydrodynamic resistance to water current flowing in line with arrow T.

Figure 9:
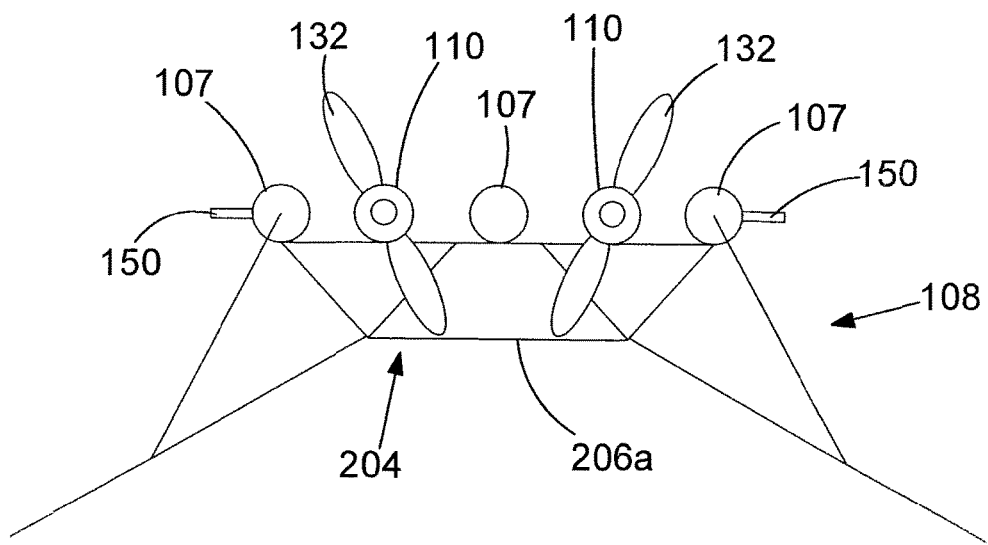
FIG. 9 is a front elevation view of a modification to the turbine assembly of FIG. 8 having two turbines.

Referring to FIG. 9, there is shown a first alternative turbine assembly 204 which comprises a turbine support 206 similar to the turbine support 106 mentioned above albeit having two turbines 110 secured to the turbine support 206. The turbine support 206 comprises a frame 206a and three buoyancy devices 107, two located at opposite ends of the frame 206a for stability and a third buoyancy device 107 in the middle of the frame 206a for additional buoyancy. The turbines 110 are secured to the frame, one turbine in each gap between the buoyancy tanks. The turbines are located approximately midway between the buoyancy devices to minimise instability about the X axis.

Figure 10:
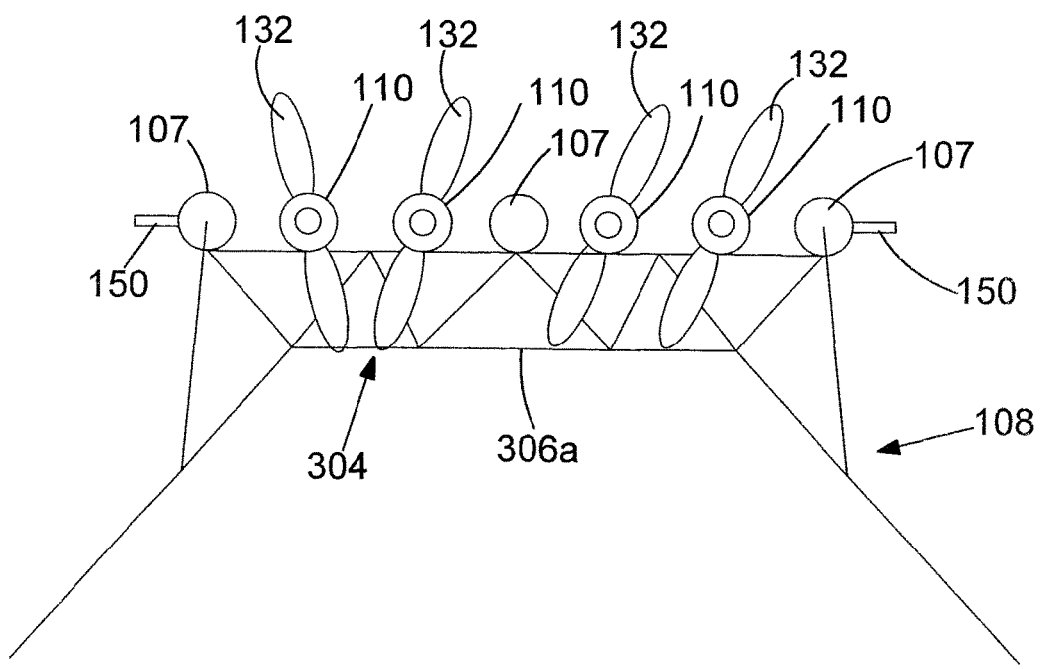
FIG. 10 is a front elevation view of a modification to the turbine assembly of FIG. 8 having four turbines.

Referring to FIG. 10, there is shown a second alternative turbine assembly 304 which comprises a turbine support 306 similar to the turbine supports 106, 206 mentioned above albeit having four turbines 110 secured to the turbine support 306. The turbine support 306 comprises a frame 306a and three buoyancy devices 107, two located at opposite ends of the frame 306a for stability and a third buoyancy device 107 in the middle of the frame 306a for additional buoyancy. The turbines 110 are secured to the frame, two turbines in each gap between the buoyancy tanks. The centre of gravity of each pair of turbines is located approximately midway between the buoyancy devices to minimise instability about the X axis.

Referring to FIGS. 8 to 10, the frame 106a, 206a, 306a of the turbine support can be made of any material strong enough to support the turbine or turbines 110 (i.e. steel, aluminium, fibre reinforced concrete, inflated material or composite).

Figure 11:
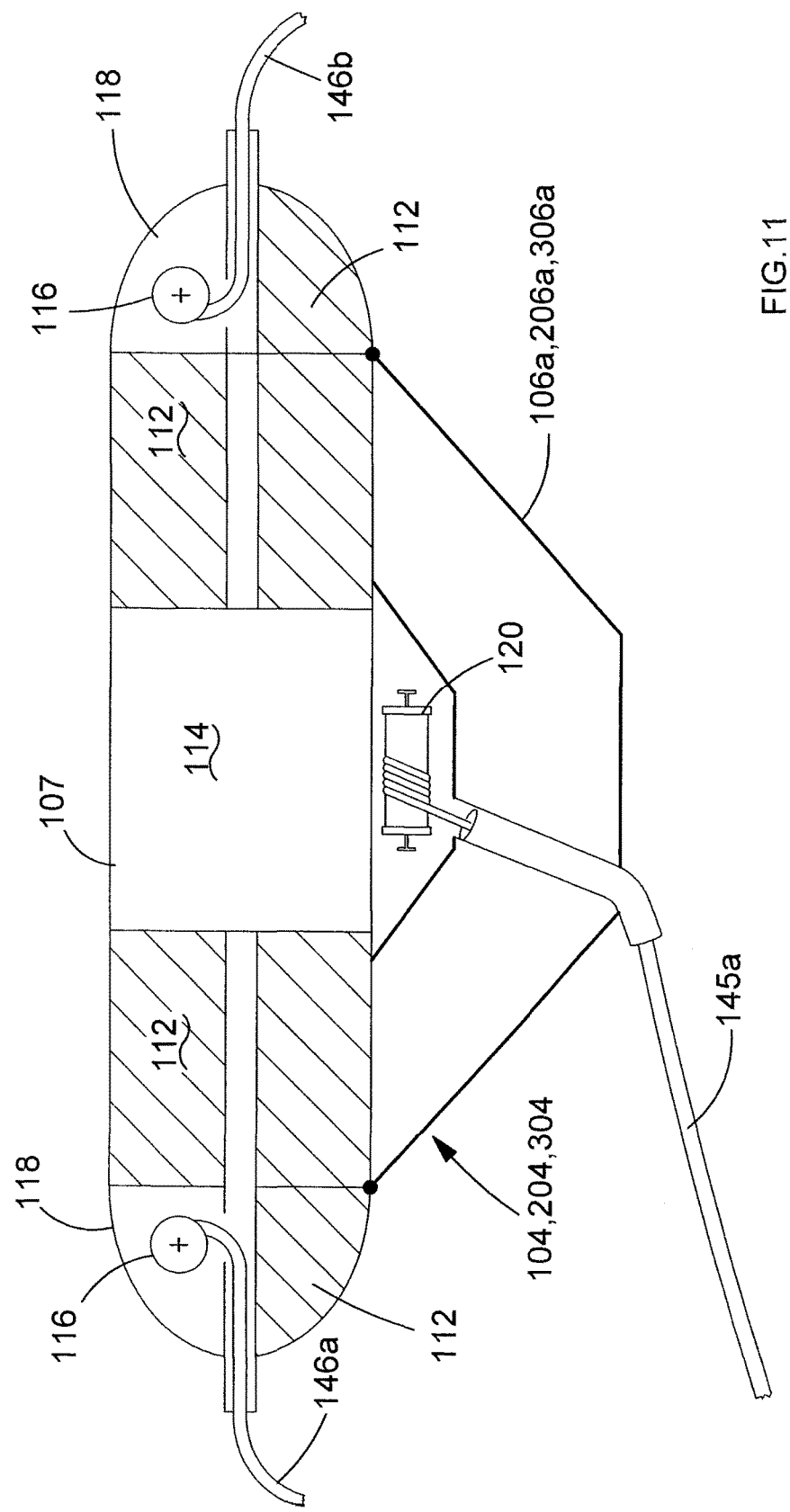
FIG. 11 is a perspective view with cut-away of a winch for adjusting a tag line of an anchor cable of the anchoring system of FIG. 8.
Figure 12:
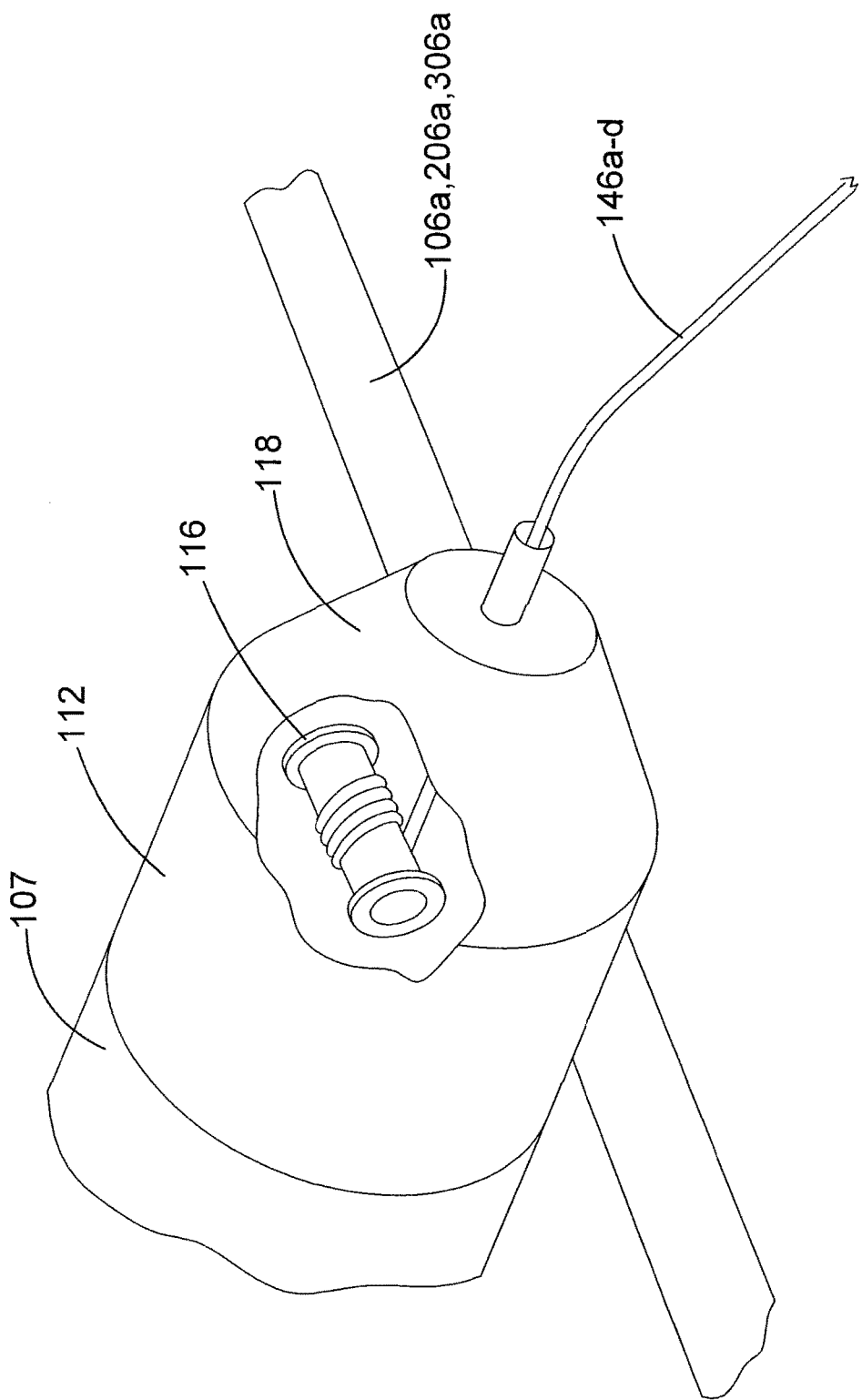
FIG. 12 is a vertical cross-section through a buoyancy device of the turbine assemblies of FIGS. 8 to 10.
Figure 13:
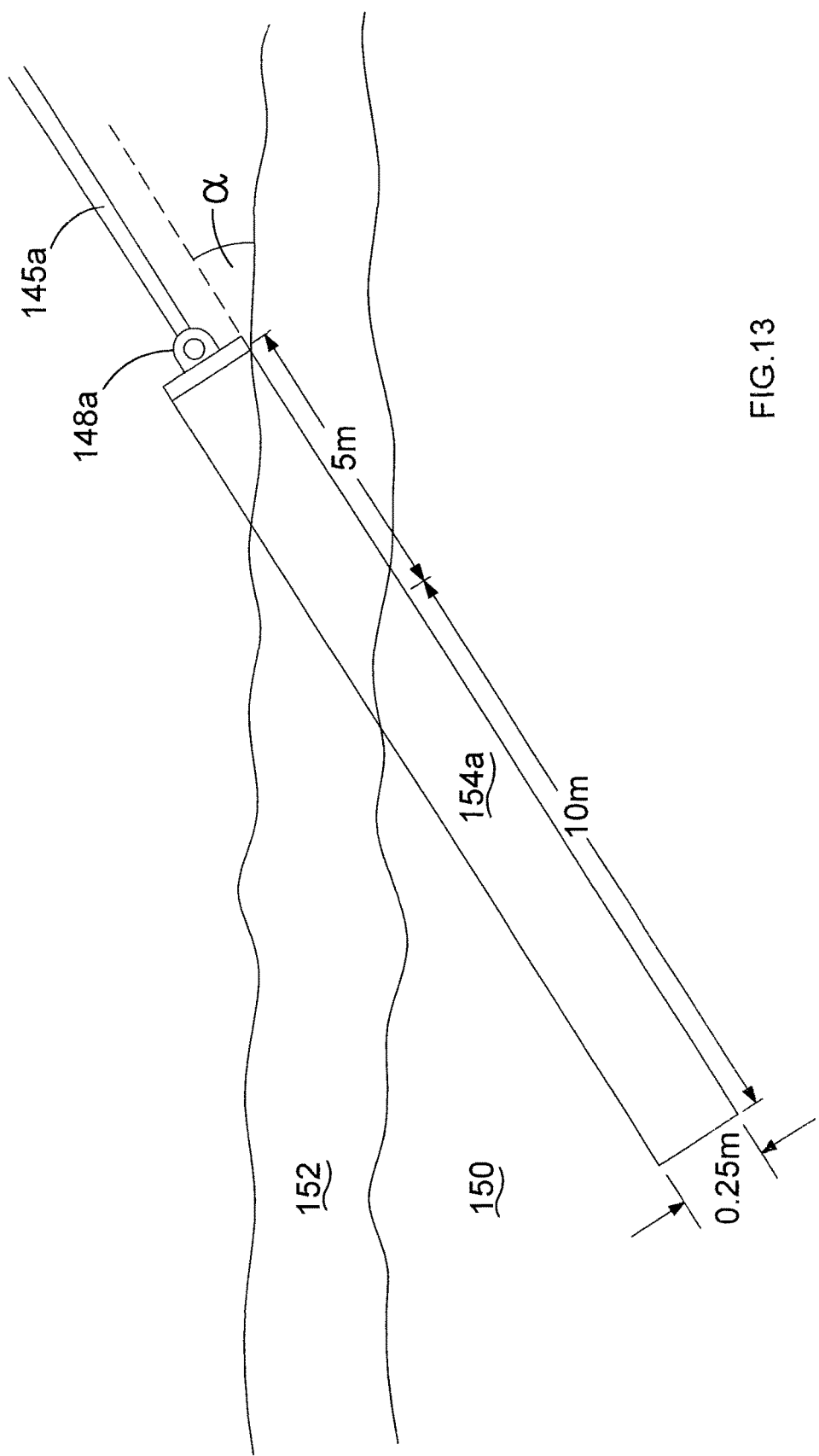
FIG. 13 is a cross-section through an anchoring point of the anchoring system of FIG. 8.

Referring to FIG. 11, the buoyancy devices 107 are secured to the frame 1006a, 206a, 306a. Each buoyancy device comprises a fixed buoyant material 112, such as foam, at opposite ends of the buoyancy device and a ballast tank 114 located in between the fixed buoyant material. The buoyancy of the turbine support may be adjusted by filling the ballast tank with water to reduce positive buoyancy. Reduced positive buoyancy may be desirable to reduce the force required to submerge the turbine assembly during its installation at a target location. The buoyancy of the turbine support may also be adjusted by emptying the water from the ballast tank and replacing it with air to increase positive buoyancy. Increased positive buoyancy may be desirable to make it easier to tow the turbine assembly to the anchoring site. The air may be compressed air stored on the turbine support. Alternatively, buoyant gel may be used or by another buoyancy medium pumped from the surface or supplied by sub-sea reservoir. The ballast tank 114 is located midway between equal amounts of fixed buoyant material 112 to minimise instability about the Y axis of the turbine assembly when the buoyancy of the ballast tank is being varied.

FIG. 11 shows a cross-section through one buoyancy device 107 secured at an end of the turbine support 106, 206, 306 and it shows parts of the frame 106a, 206a, 306a equipped with a tag line winch 116 and a mooring line winch 118. There is shown a tag line winch at each nose end 120 of the buoyancy device. Each nose end 120 is partially formed of fixed buoyant material 112 and has a fairing which covers the tag line winch. There is also shown a mooring line winch underneath the water ballast tank. The purpose of the winches is explained in more detail below.

Returning to FIG. 8, the turbine 110 has an elongate generally cylindrical body shell 122 coaxial with axis X to minimise hydrodynamic drag. As mentioned above, the turbine may have positive buoyancy and, if so, the body shell 122 is filled with buoyant material (i.e. a fluid, solid or a combination of both), or is attached to buoyant material.

The turbine 110 is a water-driveable horizontal axis turbine with a rotor 132 having two rotor blades. The rotor may have three of more rotor blades. The rotor diameter is typically 16 m for a 1 MW turbine although the rotor diameter may range from 2 meters for a 50 kW turbine, 6 meters for a 200 kW turbine and 20 meters for a 2 MW turbine. The turbine shown in FIG. 1 is not ducted, although as duct may be fitted around the rotor to shield the turbine from turbulence caused by any adjacent turbines or wave action and to increase efficiency of energy extraction from the water current. For example, the rotor 132 of the turbine 110 may be located in a duct in fluid communication with a concentrator at one end of the duct and a diffuser at the other end of the duct, like the duct 26 and the pair of flared annular sections 20a, 20b shown in FIG. 6. The turbine 110 is driveable by water flowing in either direction through the rotor 132 and generates electrical power.

Electrical connections between the turbine 110 and the turbine support 106, 206, 306 are made when the turbine is secured to the turbine support. The electrical power generated by the turbines varies with water flow rate. Each turbine has electrical power equipment (not shown) for conditioning the electrical power generated by the turbines. The turbine support has electrical power management equipment (not shown) for combining the conditioned electrical power from the turbine or turbines. The turbine support's electrical power management equipment includes a step-up transformer (not shown) for transmission of the generated electrical power to a shore, or offshore, facility via a power cable 140. A communication cable 142 from the turbine assembly accompanies the power cable.

The anchoring system 108 comprises four anchoring cables 144a-144d. Each anchoring cables comprises a mooring line 145a-145d and a tag line 146a-146d branching from the mooring line at an intermediate point along the mooring line. One end of the mooring line of each anchoring cable is connected to its nearest lower corner of the turbine frame 106a, 206a, 306a. The mooring lines are connected below the centre of buoyancy of the turbine assembly to maintain stable pitch and roll attitude. The tag line of each anchoring cable is connected to the turbine frame at the nearest nose end 120 of its nearest buoyancy device 106a, 206a, 306a (i.e. the tag line of each anchoring cable is connected to a corner of the frame end approximately above the corner of the frame where the mooring line is connected in the direction of upward force of the positive buoyancy). As such, an end of the tag and mooring lines of an anchoring cable are connected to each corner of the frame. The other opposite end of each mooring line is permanently attached to a respective anchor point 148a-148d on the sea bed. The power cable 140 and the communication cable 142 from the turbine assembly are incorporated within the mooring line 145b.

The anchoring cables 144a-144d diverge outwardly from turbine support to the water bed. The mooring lines 145a-145d under tension form the edges of a substantially pyramidal shape on the sea bed. The mean angle of inclination α of the mooring line of each anchoring cable with respect to the horizontal is approximately 25 degrees. The mean angle of inclination β of the tag line of each anchoring cable with respect to the mooring line is approximately 15 degrees.

The anchor points 148a-148d are arranged about the turbine support 106, 206, 306 to suit the sea bed topography and to maintain the turbine support in a generally horizontal position. The footprint of the anchoring system upon the sea bed, as defined by where the mooring lines of the anchoring cables are attached to the anchoring points 148a-148d, is greater in width and in length than the turbine support. The enlarged footprint improves the stability of the turbine assembly.

The upward force of the positive buoyancy of the turbine assembly 104, 204, 304 causes tensile forces along the full length of the anchoring cables 144a-144d. The turbine assembly 104, 204, 304 anchored by the anchoring system 108 typically has an operational depth in the top third of water column where power extraction from water current is optimal. This is unlike traditional anchoring systems, such as gravity anchors or columns driven into sea bed, which have an operation depth in the bottom third of water column where power extraction from water current is sub-optimal because water currents are slower down there.

The fixed buoyant material 112 of the buoyancy devices 107 has sufficient positive buoyancy in water to result in an equilibrium state at the operational depth with zero water current and wave loading when the turbine assembly 104, 204, 304 is anchored to the sea bed by the anchoring system 108. A variable component of positive buoyancy is additionally required to provide sufficient upward force to counteract the drag moment around the anchor points 148a-148d created by longitudinal drag caused by current flow and longitudinal and horizontal wave particle velocities. Water current speeds can vary between 0 m/s (calm) and 8 m/s (storm conditions) and the optimal water current speed for peak power output from the turbines 110 is about 2.5 m/s. The mean water current speed at any particular site depends on factors such as depth of water column, location of turbine assembly and the bathymetry of the sea bed. The variable component of positive buoyancy provided by the ballast tanks 114 can either be varied (i.e. by emptying of ballast tanks of water and filling them with air) upon installation of the turbine assembly at site and then be constant for its operational life or it can be varied during its operational life if required. Additionally or alternatively, the variable positive buoyancy can be supplemented throughout the tidal cycle by hydrodynamic upward force. Hydrodynamic upward force may be provided by hydrofoils, or fins, secured to the turbine support 106a, 206a, 306a. Referring to FIGS. 8 to 10, there is shown hydrofoils 150 protruding outwardly from the ballast tanks 114. The positive buoyancy and hydrodynamicupward force required to counteract the drag moment around the anchoring points is proportional to the maximum water current speed experienced by the turbine assembly. The hydrofoils 150 are shaped to increase upward force with increasing water current and, in doing so, provide increasing counteraction to the drag moment around the anchor points caused by increasing longitudinal drag and maintain the turbine assembly at the desired elevation above the sea bed.

In normal operating conditions, excursion of the turbine assembly may be about +/−2 meters in both the horizontal and vertical planes. In storm conditions, excursion of the turbine assembly may be about +/−10 meters in both the horizontal and vertical planes.

In practice, we have found that the proportion of the variable upward force divided by the total upward force (fixed and variable) of the turbine assembly should be 10% to 20% of the figure (expressed as meters/second) of the maximum current flow speed in line with the turbine assembly. Likewise, we have found that the proportion of the variable upward force divided by the total weight of the turbine assembly should be 20% to 30% of the figure (expressed as meters/second) maximum current flow speed in line with the turbine assembly.

The tag lines 146a-146d and the mooring lines 145a-145d of the anchoring cables may be ropes made of nylon, polypropylene and/or high performance polyethylene materials or the anchoring cables may be steel/wire rope, chain, solid metallic rod or solid composite rod. The tag lines are made of different material to the mooring lines and the tag lines have a greater elasticity than the mooring lines. Thus, the mooring lines are to constrain the turbine assembly against the upward force of the positive buoyancy of the turbine assembly. The tag lines are to provide directional support to counteract pitch, roll or yaw movement of the turbine assembly 104, 204, 304 about the X, Y and Z axes. The tag lines have integral resistance to shock in the event of sudden movement of the turbine assembly. Additional resistance to shock may be provided by dampers connected in series or in parallel with one or more of the tag lines.

Returning to FIG. 11, each tag line 146a-146d is connected to a respective tag line winch 116 and each mooring line 145a-145d is connected to a respective mooring line winch 118. The winches 116, 118 are operable to vary the length of the tag lines and the mooring lines. The winches are used to submerge the turbine assembly 104, 204, 304 from the water surface to its target operational depth as is explained in more detail below. Additionally, the winches may be used to adjust the orientation of the turbine assembly about the X, Y and Z axes and, in doing so, orientate it in the optimal direction when anchored to the sea bed. The winches are externally activated, typically by a remote operated vehicle, although the winches may be activated by their own electric motor. Each winch is ratcheted to lock it against unintentional release of the tag lines and mooring lines under tension. The frame 106a, 206a, 306a of the turbine assembly is equipped with the tag line and mooring line winches, but the skilled person will understand that the winches may be installed on the anchoring system, such as near or at the anchoring points 148a-148d.

Figure 14:
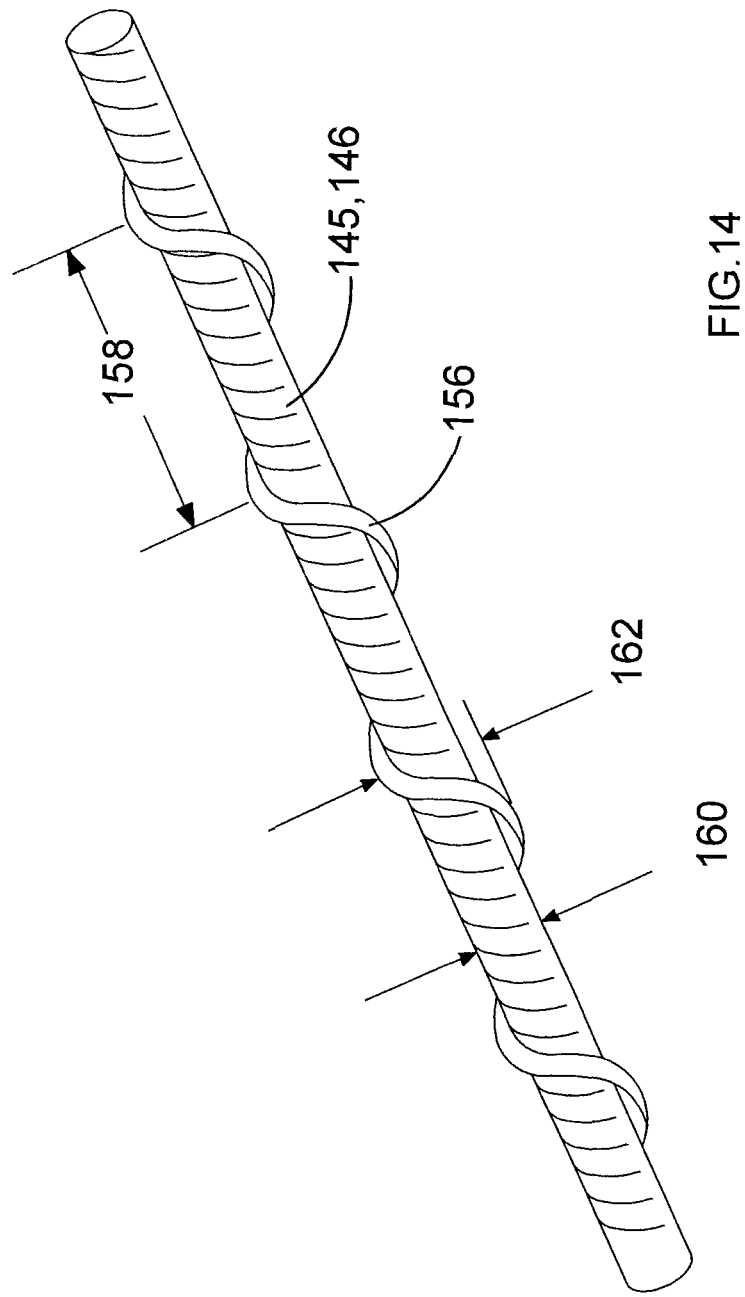
FIG. 14 is a perspective view of a tag line or a mooring line of an anchor cable of the anchoring system of FIG. 8.

Referring to FIG. 14, there is shown the mooring line 145a of anchoring cable 144a where it is connected to the anchoring point 148a. The anchoring point protrudes from in a hole drilled 15 meters into the sea bed at an angle α of approximately 25 degrees to the horizontal. The drilling operation may be performed by a remote operate vehicle deployed upon the sea bed. Approximately the bottom ten meters of the hole are in bed rock 150 and approximately the top five meters of the hole (including the open mouth of the hole) are in weathered rock 152. The diameter of the hole is approximately 0.25 m into which a single or multiple tendon anchor 154a is installed and grouted. The anchoring point 148a is on the exposed end of the anchor 154a and the mooring line is connected thereto. Once the grout has hardened tension may be applied to the mooring line.

The mooring lines 145a-145d and the tag lines 146a-146d of the anchoring cables are equipped with vortex suppressants to reduce their hydrodynamic drag and reduce any vibration caused by water flowing past them. The vortex suppressant comprises a helical protrusion 156 arranged about the circumference of each line and woven into or bonded to the strands of the rope material used to make the line. The helical protrusion has a pitch 158 of approximately twelve times the diameter 160 of the line, although a pitch 158 falling within the range of four to sixteen times the diameter 160 of the line can be used. The helical protrusion has an outer diameter 162 of approximately 150% of the diameter of the line, although an outer diameter 162 falling within the range of 110% to 200% times the diameter 160 of the line can be used.

The helical protrusion 156 is applied to the rope of the mooring line 145a-145d or tag line 146a-146d by one or more of the following methods:
  a) Arranging the weave of the material used to make the rope so that a helix is generated which is more pronounced than the other windings, and displays the characteristics of the pitch ratio described above;
  b) Additional materials may be added during the production of the rope to bulk out the rope to form the helix. The bulking material may the same material as the rope or a rigid section of thermoplastic material pre-formed as a helix and bonded to the rope; and/or
  c) An outside cover that is either wrapped or whipped around the rope with parts woven in for continuity at various points. Materials could be the same as the core rope or the others listed above.

Other possible vortex suppressants include fibre or tape strands incorporated or attached to the anchoring cables. The fibre or tape strands stream with the water flow to form a fairing, or a hydrofoil. Rotating faired sections which fit over the anchoring cables and align with the water flow, spiral sections either fitted to or incorporated into the structure of the anchoring cable, or other proprietary vortex suppression systems are also suitable.

The floating turbine assembly 104, 204, 304 is initially assembled in harbour whence it is towed to an anchorage site where four anchoring points 148a-148d have been fixed to the sea bed. The mooring lines 145a-145d and the tag lines 146a-146d of the anchoring cables 144a-144d are unwound from their respective winches 116, 118 and are submerged towards the sea bed. The free ends of the mooring lines are fixed to respective anchoring points. The variable positive buoyancy is reduced by filling the ballast tanks 114 with water. The winches are turned slowly to wind up the tag lines and mooring lines. The winches are operated by remote operated vehicle. The turbine assembly is steadily submerged to its operational depth. The ballast tanks are re-filled with air upon arrival at the operational depth. This increases positive buoyancy so that the turbine assembly is anchored to the sea bed in a state of equilibrium by the anchoring system 108 with tensile forces in the mooring lines and the tag lines.

As noted above, each feature may be provided independently and applied to other embodiments or aspects.

The invention claimed is:

1. An anchoring system for anchoring a positively buoyant turbine assembly in water, wherein the turbine assembly comprises a turbine support and has at least one flowing-water driveable turbine for generating power from water flow, wherein the turbine is secured to the turbine support, wherein the anchoring system comprises at least three anchoring cables anchorable to at least three mutually spaced anchoring points on a water bed covering a footprint greater in width and in length than the turbine assembly, wherein each anchoring point on the water bed is attachable to two mutually spaced attachment points on the turbine support to provide directional support to counteract pitch, roll, and yaw of the turbine support, and wherein the anchoring system is arranged to provide a downward force to constrain the turbine assembly to a position of floating equilibrium against the upward force of the positive buoyancy of the turbine assembly.

2. An anchoring system as claimed in claim 1, wherein the attachments points on the turbine support are mutually spaced in at least a direction of upward force of buoyancy, each anchoring cable couples the two attachment points on the turbine support to a single anchor point on the water bed, and each anchoring cable bifurcates into a pair of cable branches for coupling to the pair of mutually spaced attachment points on the turbine support.

3. An anchoring system as claimed in claim 2, wherein each anchoring cable comprises a mooring line to constrain the turbine assembly against the upward force of the positive buoyancy of the turbine assembly, wherein each anchoring cable comprises a tag line to provide directional support to the turbine assembly and wherein the tag line branches from the mooring line at an intermediate point along the length of the mooring line.

4. An anchoring system as claimed in claim 1, wherein the at least three anchoring cables are at least six pairs of anchoring cables and the ends of each pair of anchoring cables are coupled to a respective anchor point on the water bed, wherein the anchoring cables of each pair of anchoring cables diverge from said anchoring point to where opposite ends of the anchoring cables are fixed to a pair of mutually spaced points of the turbine assembly, and wherein at least three pairs of anchoring cables are fixed to each end of the elongate turbine support.

5. An anchoring system as claimed in claim 1, wherein an angle of inclination of the anchoring cables from the water bed and with respect to the horizontal is 30 degrees+/−15 degrees.

6. An anchoring system as claimed in claim 1, wherein the anchoring cables are streamlined and/or equipped with vortex suppressants.

7. A submersible turbine assembly comprising the anchoring system of claim 1, and wherein the turbine assembly is positively buoyant in water.

8. A turbine assembly according to claim 7, wherein the turbine assembly comprises at least one winch each with a respective pull line connectable to the anchoring system, and wherein the or each winch is operable to pull the turbine assembly towards the water bed by tensile forces acting through the pull line and wherein the or each winch is lockable against tensile forces acting through the pull line.

9. A turbine assembly as claimed in claim 8, wherein each pull line is integrally connected to a part of a respective anchoring cable.

10. A method of anchoring a positively buoyant turbine assembly having variable positive buoyancy in water and comprising at least one winch having a respective pull line connectable to an anchoring system to a water bed wherein the turbine assembly comprises at least one flowing-water driveable turbine for generating power from water flow and the anchoring system comprises at least three anchoring cables, wherein the method comprises the steps of:
  (a) floating the turbine assembly to an installation site;
  (b) attaching each anchoring cable to two respective mutually spaced attachment points on the turbine assembly;
  (c) anchoring each anchoring cable to a respective one of at least three mutually spaced anchoring points on a water bed, wherein the at least three mutually spaced anchoring points cover a footprint greater in width and in length than the turbine assembly and wherein each anchoring point on the water bed is arranged to provide a downward force to constrain the turbine assembly to a position of floating equilibrium against the upward force of the positive buoyancy of the turbine assembly;
  (d) reducing the positive buoyancy of the turbine assembly;
  (e) operating the or each winch to submerge the turbine assembly to a target location by force of tension in the or each pull line; and
  (f) locking the or each winch upon arrival at the target location.

11. The method of claim 10 further comprising a step of:
  (g) increasing the buoyancy of the turbine assembly.

* * * * *